(12) United States Patent
Westcott et al.

(10) Patent No.: US 9,377,520 B2
(45) Date of Patent: Jun. 28, 2016

(54) SYSTEMS AND METHODS FOR DIRECT EMITTER GEOLOCATION

(71) Applicant: L-3 Communications Integrated Systems L.P., Greenville, TX (US)

(72) Inventors: Bryan L. Westcott, Rockwall, TX (US); Steven P. Stanners, Rowlett, TX (US)

(73) Assignee: L-3 Communications Integrated Systems LP, Greenville, TX (US)

( * ) Notice: Subject to any disclaimer, the term of this patent is extended or adjusted under 35 U.S.C. 154(b) by 459 days.

(21) Appl. No.: 13/907,553

(22) Filed: May 31, 2013

(65) Prior Publication Data

US 2014/0327571 A1 Nov. 6, 2014

Related U.S. Application Data

(60) Provisional application No. 61/818,829, filed on May 2, 2013.

(51) Int. Cl.
| | |
|---|---|
| *G01S 3/02* | (2006.01) |
| *G01S 5/04* | (2006.01) |
| *G01S 5/02* | (2010.01) |

(52) U.S. Cl.
CPC ........................................ *G01S 5/02* (2013.01)

(58) Field of Classification Search
CPC .................................. G01S 5/04; G01S 5/0221
USPC .................. 342/351, 436, 437, 444, 463, 465
See application file for complete search history.

(56) References Cited

U.S. PATENT DOCUMENTS

| | | | | |
|---|---|---|---|---|
| 4,809,005 A | * | 2/1989 | Counselman, III | .... G01C 15/00 342/352 |
| 7,436,910 B2 | | 10/2008 | Fudge et al. | |
| 7,436,912 B2 | | 10/2008 | Fudge et al. | |
| 8,188,919 B2 | | 5/2012 | Grabbe et al. | |
| 2003/0156058 A1 | * | 8/2003 | Edwards | ................. G01S 19/42 342/357.64 |
| 2013/0244692 A1 | * | 9/2013 | Kelly | ...................... H04W 4/02 455/456.1 |

OTHER PUBLICATIONS

Bosse et al., "A Multiple Narrowband Emitters Geolocation Algorithm Based on AOA Estimations", 18th European Signal Processing Conference, Aug. 23-27, 2010, 5 pgs.

(Continued)

*Primary Examiner* — Dao Phan
(74) *Attorney, Agent, or Firm* — Egan, Peterman, Enders & Huston LLP

(57) ABSTRACT

Systems and methods are disclosed for locating signal wave (SW) emitter/s using at least one moving signal collection platform. The disclosed systems and methods may be employed in one embodiment to estimate the signal energy transmitted from a grid of locations (such as a map) using collected IQ data (or other raw data representation such as IQ data covariance matrix), and without requiring computation of any intermediate geolocation-observable measurements (such as angle-of-arrival, direction-of-arrival, etc.). In a further embodiment, the disclosed systems and methods may be implemented in a blind manner (i.e., transmitted emitter signal/s are unknown and processed blindly) to geolocate SW emitters using a single SW signal collection platform (e.g., at relatively large standoff distances in some implementations) without relying on a known signal modulation or operation of multiple simultaneous SW signal collection platforms.

30 Claims, 4 Drawing Sheets

(56) References Cited

OTHER PUBLICATIONS

Ke et al., "Sparsity-Based Multi-Target Direct Positioning Algorithm Based on Joint-Sparse Recovery" Progress in Electromagnetics Research, vol. 27, 2012, 16 pgs.
Weiss et al., "Direct Geolocation of Stationary Wideband Radio Signal Based on Time Delays and Doppler Shifts", IEEE, 2009, 4 pgs.
Amar et al., "A Decoupled Algorithm for Geolocation of Multiple Emitters", 2006, 26 pgs.
Nadarajah, "A Generalized Normal Distribution", Journal of Applied Statistics, vol. 32, No. 7, Sep. 2005, 10 pgs.
Maleh et al., "Fast Algorithm for Sparse Signal Approximation Using Multiple Additive Dictionaries", Signal Processing With Adaptive Sparse Structured Representations, 2009, 5 pgs.
Babacan et al., "Non-Convex Priors in Bayesian Compressed Sensing", 17th European Signal Processing Conference, 2009, 5 pgs.
O'Grady e al., "Compressive Sampling of Non-Negative Signals", IEEE, 2008, 6 pgs.
Eltoft et al., "On the Multivariate Laplace Distribution", IEEE Signal Processing Letters, vol. 13, No. 5, May 2006, 4 pgs.
Wang et al., "Direction Estimation Using Compressive Sampling Array Processing", IEEE, 2009, 4 pgs.
Malioutov et al, "A Sparse Signal Reconstruction Perspective for Source Localization With Sensor Arrays", IEEE Transactions on Signal Processing, vol. 53, No. 8, Aug. 2005, 13 pgs.
Tropp et al. "Signal Recovery From Random Measurements Via Orthogonal Matching Pursuit", IEEE Transactions on Information Theory, vol. 53, No. 12, Dec. 2007, 12 pgs.
Chen et al., "Atomic Decomposition by Basis Pursuit", SIAM Journal on Scientific Computing, 1996, 30 pgs.
Krim et al., "Two Decades of Array Signal Processing Research", IEEE Signal Processing Magazine, 1996, 28 pgs.
Dantizig et al., "Linear Programming", Introduction, Chapter 3, pp. 63-98, The Simplex Method, 1997, 38 pgs.

\* cited by examiner

SYSTEMS AND METHODS FOR DIRECT EMITTER GEOLOCATION

This application claims the benefit of U.S. Provisional Patent Application No. 61/818,829, filed on May 2, 2013 and entitled "Systems and Methods for Direct Emitter Geolocation", which is incorporated herein by reference in its entirety for all purposes.

FIELD OF THE INVENTION

This invention relates to emitter geolocation.

BACKGROUND OF THE INVENTION

Emitter geolocation methods exist that rely either on use of multiple separate simultaneous signal collection platforms (e.g., separate aircraft), or rely on knowledge of the signal modulation structure of an emitter signal. For example, a direct approach to geolocation that requires knowledge of emitter signal modulation has been conventionally employed. Such a direct approach does not require determination of an intermediate geolocation observable measurement such as from time difference of arrival (TDOA), frequency difference of arrival (FDOA), direction of arrival (DOA), etc. However, such a conventional direct geolocation approach requires and relies on prior knowledge of some or all of the emitted signal (e.g., a known reference signal embedded in the full emitted signal), i.e., some or all of the modulation applied to the emitted signal must be known in advance at the collection platform. Conventional array-based multi-emitter geolocation techniques also exist that rely on use of multiple separate simultaneous collection platforms such as separate aircraft.

Other existing array-based direction finding systems exist that can locate multiple cochannel emitters using intermediate geolocation observable measurements. One conventional geolocation approach generates multiple line-of-bearing (LOB) measurements (hard decisions), and then estimates position based on these observables. Several algorithms exist to generate LOBs in a co-channel environment (e.g., such as MUSIC, MVDR). Conventional observable-based geolocation techniques typically become impossible with low-SNR emitters and overloaded environments (i.e., environments with more signals than antenna elements). Conventional observable-based geolocation techniques are also sub-optimal in the sense that hard decisions are made on small blocks of data, without considering the spatial correlation of the emitters.

SUMMARY OF THE INVENTION

Disclosed herein are systems and methods for locating signal wave (SW) emitter/s using at least a single moving signal collection platform. The disclosed systems and methods may be employed in one embodiment to estimate the signal energy transmitted from a grid of locations (such as a map) using collected IQ data (or other raw-data representations such as a IQ data covariance matrix), and without requiring computation of any intermediate geolocation-observable measurements (such as angle-of-arrival, direction-of-arrival, line-of-bearing, time-of-arrival, frequency-of-arrival, frequency-difference-of-arrival and time-difference of arrival). In a further embodiment, the disclosed systems and methods may be implemented in a blind manner (i.e., transmitted emitter signal/s are unknown and processed blindly) to geolocate SW emitters using a single SW signal collection platform (e.g., at relatively large standoff distances in some implementations) without relying on a known signal modulation or operation of multiple simultaneous SW signal collection platforms. In one further embodiment the final SW location estimate may be combined with additional geolocation observables if available.

In a further embodiment, partial timing structure and/or frequency structure information may be known about the signal modulation (e.g., if a SW is known to be active only at a discrete set of times or if a SW is known to move in frequency in a deterministic pattern) and may be employed to improve geolocation accuracy (e.g., if data is only collected at times and frequencies when the SW is known to be active, the interference of cochannel emitters may be reduced) without requiring a known reference emitter signal or complete knowledge of the signal modulation or transmitted SW (e.g., a SW emitter may be known to employ a time-division-multiple-access scheme, which may provide information on when a signal is active but not what signal is being transmitted when the SW emitter is active).

The energy collected from a set of discrete blocks of data may be projected onto all points on the grid, and then the resulting surface may be decomposed in order to separate (and geolocate) multiple emitters if they exist. In one embodiment, both the presence and geolocation of an unknown emitter may be simultaneously detected. Examples of some of the features that may be advantageously achieved individually or in combination in various embodiments of the disclosed systems and methods include, but are not limited to, an entire collection system based on this technique may be implemented with a relatively-small amount of code (e.g., allowing the geolocation system to be highly portable where desired); implementation of the disclosed geolocation solution techniques using field programmable gate array (FPGA) and/or graphics processing unit (GPU) acceleration; and/or use of geolocations to task additional collect resources for low-signal to noise ratio (SNR) or very wideband emitters (i.e., not relying on an observable power spectrum).

The disclosed systems and methods may be implemented in one exemplary embodiment using a standard interferometry array for coherent collection of SW signals from an aircraft or other single mobile and moving SW signal collection platform, although it is also possible to implement the disclosed systems and methods using multiple SW signal collection platforms, e.g., by using additional stationary and/or moving platform/s. Unknown emitters of interest may be located by measuring temporal variation of collected SW signals and decomposing multiple blocks of raw multi-channel array data collected from at least one SW signal collection platform. The SW signal data may be collected and/or processed across defined periods of time (e.g., such as in multiple data collection bursts or in a single defined collection time period to produce window/s of data for processing), or may be collected on a continuous basis with no pre-defined collection time period (in which case the collected data may be buffered and the collection data set continues to grow over time). Emitters of interest may be located using a variety of processing methods, including iterative methods or with single pass sparse reconstruction techniques. The disclosed systems and methods may also be extended to location of wide-bandwidth emitters and may incorporate other information about the emitters and/or environment, where available. In one embodiment, moving-target (emitter) geolocation may be performed by further statistically processing collected data projected onto all points on a grid, e.g., using a moving vector of the collected data. Although the interferometry array may be used in one embodiment, it will be understood that it is possible that other embodiments of the disclosed systems and methods may be implemented using a single antenna element on a single platform or single antenna elements on respective multiple platforms for location of SW emitters.

Unlike conventional techniques that require LOBs to be calculated for a given emitter, the disclosed systems and methods may be implemented to individually calculate the magnitude of the potential for each of many different defined points on the ground (or other range or set of potential emitter locations) to be the source of the emission/s received at the signal collection platform at a given time from a given emitter. The magnitude of the calculated potential for each given different point at a given time may be assigned to each point, e.g., by color coding on a display (e.g., video display) or using any other suitable point-weighting or value assignment methodology. As the signal collection platform moves relative to the emitter source/s, multiple values of cumulative emitter potential may be integrated over time (e.g., dynamically in real time) for each given point to result in a matrix of integrated point values that indicates actual emitter location/s. For example, in one exemplary embodiment, a displayed map of possible emitter locations that is color coded according to calculated magnitude of emitter source potential may be seen to transition from lines to peaks as cumulative emitter location potential is integrated over time in a manner that visually indicates actual emitter location/s. The disclosed systems and methods may be implemented in one embodiment to use covariance data directly in order to support single-collection platform operation (i.e., SW data collection occurring at only one platform such as one aircraft) while still obtaining most of the benefit from not using hard decisions (LOBs).

The disclosed systems and methods may be advantageously implemented using a variety of types of signal collection platforms under a variety of different operating environments including, for example, using large-standoff platforms and low space weight and power (SWAP) commutated array platforms. Greatly simplified (and highly portable) collection systems may also be achieved in one embodiment. The disclosed systems and methods may utilize one or more processing devices may be utilized to perform direct IQ emitter geolocation, e.g., such as microprocessor, central processing unit (CPU), field gate programmable array (FPGA), application specific integrated circuit (ASIC), etc. In one embodiment, FPGA-based implementation may be employed in order to achieve a relatively small signal location system.

Advantageously, in one exemplary embodiment, the disclosed systems and methods may be implemented to locate one or more low power emitters (e.g., having an emitter power that is lower than or under the noise floor throughout the integration) using a single SW signal collection platform (e.g., aircraft or other suitable mobile platform such as spacecraft, satellite, ship, wheeled vehicle, submarine, etc.) that moves relative to the emitter location/s. In another exemplary embodiment, the disclosed systems and methods may be implemented to locate multiple cochannel (or co-frequency) emitters that all simultaneously transmit on the same frequency. The disclosed systems and methods may be further employed in another exemplary embodiment to detect multiple emitters in a manner that is not limited by the number of antenna elements, e.g., by using overloaded array processing to locate more SW signal emitters than the number of elements present in an interferometry array of a SW signal collection platform. These features may be combined in one exemplary embodiment to achieve overloaded array cochannel processing to locate multiple low-power SW emitters. In a further embodiment, more than one SW signal collection platform may be employed to further enhance location of unknown emitter/s.

In another exemplary embodiment, direct geolocation of multiple emitters of unknown location may be achieved by performing an iterative serial nulling or cancellation process. Such a serial nulling process may include using an interferometer array on a moving signal collection platform to collect SW signal data that includes signals received from multiple cochannel emitters transmitting from unknown locations along the path of the moving collection platform (e.g., along an aircraft flight path). The collected SW data may be processed and mapped (or otherwise digitized and/or stored) in a manner that facilitates visual identification of signal peaks that represent potential emitter locations. Geolocations of the multiple emitters may be sequentially identified and determined.

Using a serial nulling processing technique embodiment, the geolocation of the strongest emitter (i.e., the overall peak in the collected data) of a group of multiple emitters of interest may be first identified. Then, the contribution of this identified emitter may be surgically subtracted from the overall data set to result in a new data set that includes all but the signal contribution of the removed strongest emitter. Then, the next strongest emitter peak (i.e., the overall peak in the remaining collected data) may be identified and located, and surgically subtracted as before. This identification and subtraction process may be repeated for each additional emitter, e.g., until a greater number of emitters have been located than the number of antenna elements in the array so as to achieve overloaded array processing. In one embodiment, the location of each identified emitter may be optionally indicated and displayed (e.g., on a graphical user interface or GUI) in real time by unique color code and/or symbol. Once all unknown SW signal emitters of interest have been located using this approach, the actual location (e.g., ground truth) of each of the multiple emitters is known, and may be displayed (e.g., as a complex map showing several potential peaks) and/or may be otherwise digitized, processed and/or stored for later use. In a further embodiment, the disclosed serial nulling emitter location processing may be simultaneously performed in parallel on a large number of different frequencies, allowing for simultaneous cochannel/low power emitter geolocation in multiple SW bands.

As described above, direct geolocation of multiple emitters may be solved in one exemplary embodiment using an iterative technique (i.e., select a signal, cancel or subtract the signal, and repeat). However, it is possible to use other suitable techniques to process array information of a single moving signal collection platform to solve for the geolocations of multiple emitters, including single-pass techniques. For example, in one exemplary embodiment, a sparse reconstruction technique may be employed to process SW signal information received at the array of a single moving collection platform, e.g., using a framework that exploits the spatial sparsity of the emitters which may be characterized as a statistical estimation problem formulation. Such sparse reconstruction techniques may be used to take advantage of the fact that the number of emitter locations is small, and may be applied in one embodiment to stationary or fixed emitter locations where location of the emitters does not change over time during at least a portion of the duration of a SW data collection time. Further numerical refinement of the accuracy of one or more selected geolocations may also be optionally performed using any technique or combination of techniques suitable for increasing confidence of geolocation solutions obtained using the disclosed systems and methods.

In one respect, disclosed herein is a method for locating at least one signal wave (SW) emitter of unknown modulation using a single moving signal collection platform, including: collecting a raw data representation of SW signal emissions within a SW emissions environment only at the single moving collection platform, the raw data representation of SW signal emissions including SW emissions of unknown modulation from the SW emitter, and the raw data representation including data samples having magnitudes that are characteristic of received signal energy of the SW emitter; estimating the signal energy transmitted within the SW emissions environment from a two or three dimensional grid of locations using the raw data representation collected only at the single moving signal collection platform; and determining the location of the SW emitter on the two dimensional or three dimensional grid from an estimated signal energy distribution across the two or three dimensional grid without knowledge of the modulation of the SW emissions from the SW emitter and without determining any intermediate geolocation observable measurement.

In another respect, disclosed herein is a signal wave (SW) emitter location system, including a single mobile signal collection platform including at least one antenna element coupled to signal processing circuitry and configured to receive SW signal emissions within a SW emissions environment as the signal collection platform is moving. The signal processing circuitry may be configured to: use the at least one antenna element to collect a raw data representation of the SW signal emissions within the SW emissions environment as the signal collection platform is moving, the raw data representation of SW signal emissions including SW emissions from at least one SW emitter of unknown modulation, and the raw data representation including data samples having magnitudes that are characteristic of received signal energy of the SW emitter; estimate the signal energy transmitted within the SW emissions environment from a two or three dimensional grid of locations using the raw data representation collected only at the single moving signal collection platform; and determine the location of the SW emitter on the two dimensional or three dimensional grid from an estimated signal energy distribution across the two or three dimensional grid without knowledge of the modulation of the SW emissions from the SW emitter and without determining any intermediate geolocation observable measurement.

In another respect, disclosed herein is a method for locating at least one signal wave (SW) emitter using at least a single moving signal collection platform. The method may include: collecting a raw data representation of SW signal emissions within a SW emissions environment at the single moving collection platform, the raw data representation of SW signal emissions including SW emissions from the SW emitter, and the raw data representation including data samples having magnitudes that are characteristic of received signal energy of the SW emitter; estimating the signal energy transmitted within the SW emissions environment from a two or three dimensional grid of locations using the collected raw data representation; and determining the location of the SW emitter on the two dimensional or three dimensional grid from an estimated signal energy distribution across the two or three dimensional grid. The collected raw data representation of SW signal emissions may include SW emissions from multiple SW emitters; where the raw data representation includes data samples having magnitudes that are characteristic of received signal energy of each of the SW emitters. The method may further include: decomposing and separating the received signal energy of the raw data representation into the signal energy contributions for each of the multiple SW emitters at a single location on the grid, and determining a location of each of the multiple SW emitters on the grid based at least in part on the received signal energy contribution of each SW emitter, where each SW emitter remains stationary on the grid at the same time that the signal collection platform moves relative to the SW emitter and collects the raw data representation of SW signal emissions. The method may also further include decomposing and separating the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter; or a combination thereof.

In another respect, disclosed herein is a SW emitter location system, including at least one mobile signal collection platform including at least one antenna element coupled to signal processing circuitry and configured to receive SW signal emissions within a SW emissions environment as the signal collection platform is moving. The signal processing circuitry may be configured to: use the at least one antenna element to collect a raw data representation of the SW signal emissions within the SW emissions environment as the signal collection platform is moving, the raw data representation of SW signal emissions including SW emissions from the SW emitter, and the raw data representation including data samples having magnitudes that are characteristic of received signal energy of the SW emitter; estimate the signal energy transmitted within the SW emissions environment from a two or three dimensional grid of locations using the collected raw data representation; and determine the location of the SW emitter on the two dimensional or three dimensional grid from an estimated signal energy distribution across the two or three dimensional grid. The collected raw data representation of SW signal emissions may include SW emissions from multiple SW emitters; where the raw data representation includes data samples having magnitudes that are characteristic of received signal energy of each of the SW emitters. The signal processing circuitry may be further configured to: decompose and separate the received signal energy of the raw data representation into the signal energy contributions for each of the multiple SW emitters at a single location on the grid, and determine a location of each of the multiple SW emitters on the grid based at least in part on the received signal energy contribution of each SW emitter, where each SW emitter remains stationary on the grid at the same time that the signal collection platform moves relative to the SW emitter and collects the raw data representation of SW signal emissions. The signal processing circuitry may be further configured to decompose and separate the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter, or a combination thereof.

DESCRIPTION OF ILLUSTRATIVE EMBODIMENTS

Figure 1:
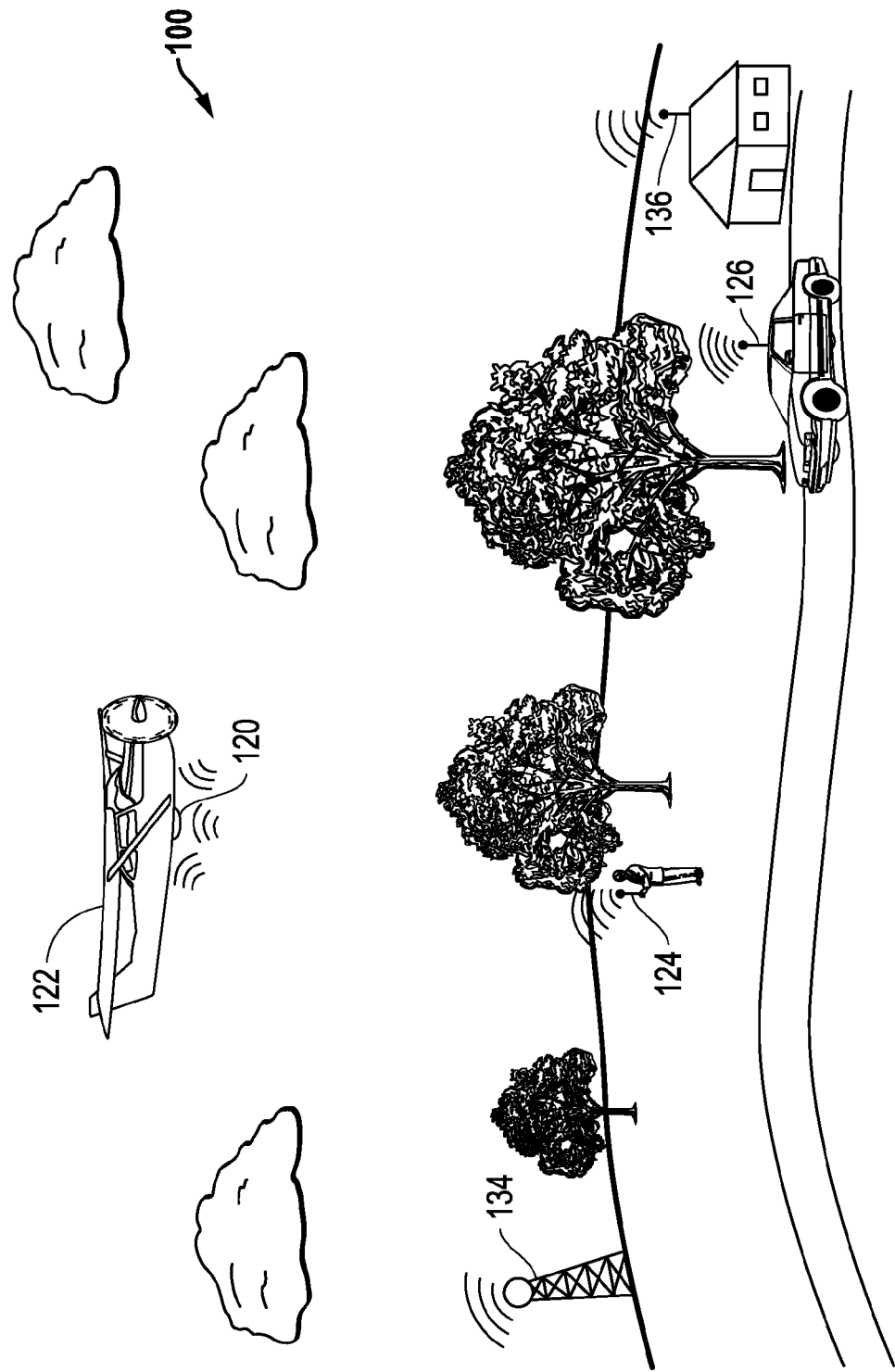
FIG. 1 illustrates an electromagnetic (EM) signal emissions environment according to one exemplary embodiment of the disclosed systems and methods.

FIG. 1 illustrates one exemplary embodiment of a SW emissions environment 100 (in this case a radio frequency (RF) communication environment) in which multiple ground-based emitters 124, 126, 134 and 136 at unknown locations are transmitting RF signals of interest. In the illustrated embodiment of FIG. 1, unknown emitters 124 and 126 are mobile emitters that may be moving and/or stationary while transmitting. In this example, mobile emitter 124 is carried by a human being, and mobile emitter 126 is supported by a moving vehicle that results in emitter transmission from changing location. Unknown emitters 134 and 136 are stationary emitters that transmit emitter signals from respective fixed locations as shown.

It will be understood that the disclosed systems and methods may be practiced in SW signal emission environments in which any type, number and/or combination of different types of SW emitters are emitting on one or more frequencies. It will be understood that a SW emission may be an emission, intentional or otherwise whether information-bearing or not. Examples of types of SW signal emissions that may be collected and used to locate SW signal emitters include, but are not limited to, electromagnetic (EM) signals (e.g., visible light, infrared light, radio frequency, etc.), acoustic (e.g., sonar), etc. Examples of RF emitters include, but are not limited to, base stations of a cellular telephone network, cell phone devices, weather broadcast stations, radar signal sources, microwave sources, etc. Regardless of SW emitter signal type, an emitter may be permanently-fixed (e.g., fixed at a house or building, fixed on a transmission tower, etc.) or may be mobile such as hand-carried by a human being, vehicle-borne (e.g., borne by automobile, ship, train, aircraft, submarine, etc.). It will be understood that SW emitters may be located on a fixed surface (e.g., such as the surface of the earth), or may be located within a signal transmission medium, such as water or air.

In the exemplary embodiment of FIG. 1, a mobile signal collection platform 120 is provided in the form of an airborne-based signal collection platform including an interferometer array 120 mounted on an aircraft. However, although a manned aircraft is illustrated as a mobile sensing platform in FIG. 1, a mobile sensing platform may be any other type of manned or unmanned vehicle or other movable device that is suitable for containing or otherwise supporting one or more interferometer arrays while moving relative to one or more SW emitters while at the same time capturing SW signals emitted from the SW emitter/s to allow determination of emitter geolocation in the manner described elsewhere herein.

Examples of other types of mobile sensing platforms include, but are not limited to, other types of aerial vehicles (e.g., unmanned aerial vehicles (UAVs), helicopters, etc.), space vehicles (e.g., satellites, missiles, etc.), surface vehicles (e.g., submarines, boats, trains, cars, trucks, etc.). Furthermore, it will also be understood that the disclosed systems and methods may be optionally implemented using one or more additional stationary sensing platforms and/or using any other type, number and/or combination of different types of mobile and/or stationary signal collection platforms including, but are not limited to, hand-carried platforms, vehicle-borne platforms (e.g., borne by automobile, ship, train, space vehicles, etc.), stationary platforms (e.g., fixed at a house or building, fixed on a transmission tower, etc.), a combination thereof, etc.

Figure 2:
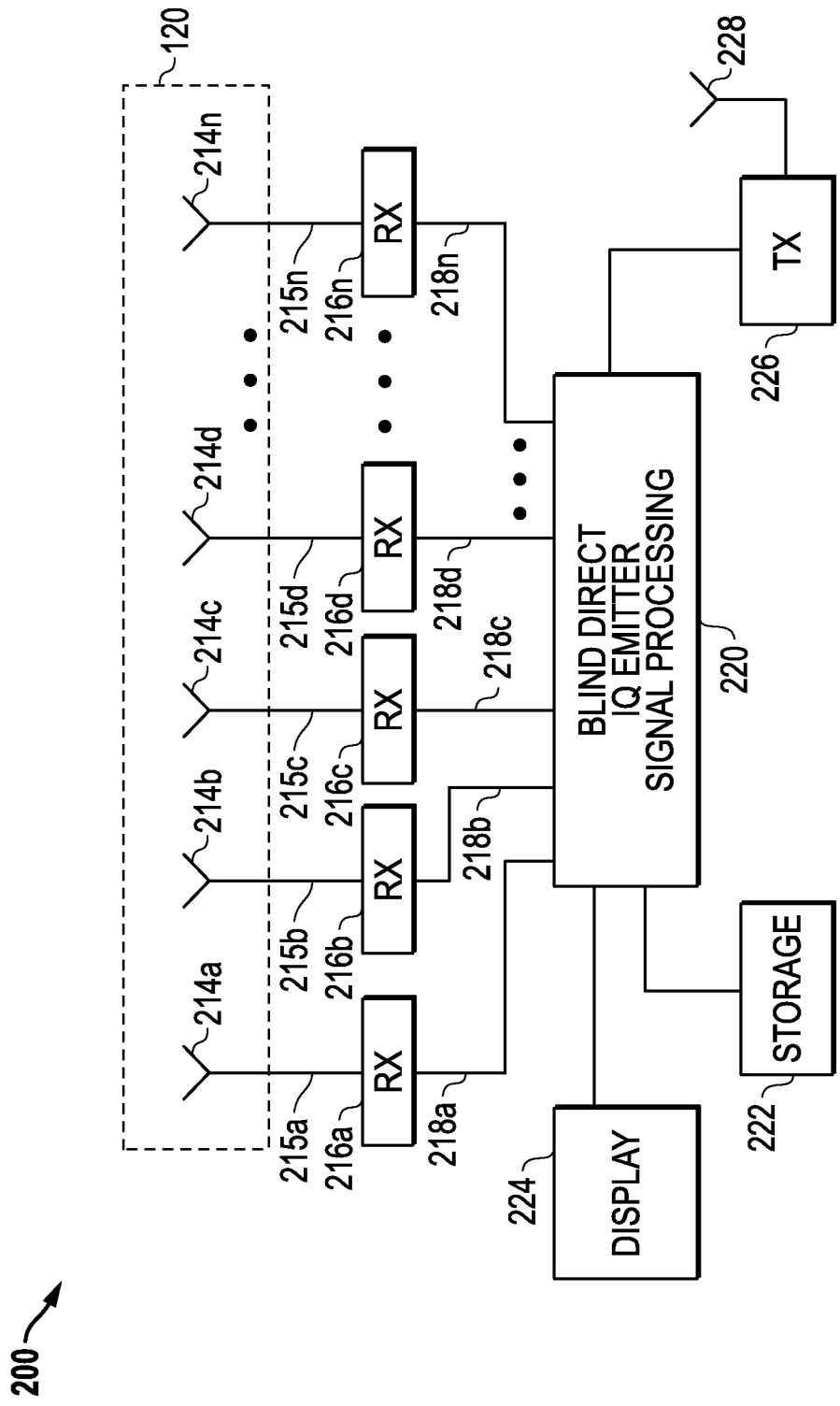
FIG. 2 illustrates a block diagram of an interferometer system according to one exemplary embodiment of the disclosed systems and methods.

FIG. 2 illustrates one exemplary embodiment of a block diagram of an interferometer system 200, such as may be at least partially contained on mobile signal collection platform 122. As shown, interferometer system 200 includes interferometer array 120 that includes multiple spaced antenna elements 214a to 214n. In this regard, it will be understood that an interferometer array 120 may include two or more antenna elements 214 suitably spaced to allow measurement and/or usage of the difference in received phase and/or gain of SW emitter signals at each element 214 in the antenna array in a manner that allows further processing as described herein. Interferometer array 120 may have a longitudinal axis that is aligned at any desired angle to the horizon, e.g., azimuth, elevation, etc. In the illustrated embodiments, array 120 is an interferometry array, although any other type of array suitable for receiving one or more types of SW signals for purpose of locating emitters of such signals. Examples include, but are not limited to, low-frequency EM (e.g., ELF) sensor arrays, optical electromagnetic sensor arrays, and also acoustic sensor arrays (e.g., sonar).

Still referring to FIG. 2, each of antenna elements 214a to 214n is coupled as shown to provide a respective received analog emitter signal 215a to 215n to respective receiver circuitries 216a to 216n. Each of receiver circuitries 216a to 216n convert analog signals 215a to 215n to received digital emitter signals 218a to 218n, which are provided to blind direct IQ emitter signal processing circuitry 220 which may be, for example, a digital signal processor (DSP), although any other type of one or more suitable programmed processing device/s (e.g., controller, microcontroller, processor, microprocessor, FPGA, ASIC, etc.) with any suitable configuration of hardware, software, or firmware may be employed. Blind direct IQ emitter signal processing circuitry 220 is configured to in turn process digital emitter signals 218a to 218n to perform the steps further described herein in relation to FIG. 3. Also illustrated in FIG. 2 are data storage 222 (e.g., magnetic or optical hard drive, solid state hard drive, etc.) and video display 224, either or both or which may be optionally present on signal collection platform 122 to store and/or display raw received IQ emitter data, partially processed geolocation data, and/or determined emitter geolocation data received from signal processing circuitry 220. Although FIG. 2 illustrates a system 200 that includes blind direct IQ emitter signal processing circuitry, it will be understood that a geolocation system may be implemented with any other type of signal processing circuitry suitable for performing SW emitter geolocation according to one or more of the techniques described herein. Moreover, it is also possible that any other type of signal collection sensor element/s may be alternatively employed other than an antenna array. It will be understood that other array configurations are possible including compressive sensing (CS) arrays, in which the receiver circuits (216a to 216n) sample a linear weighted combination of sensors, where the number of sensors may exceed the number of receiver circuits. Examples of receiver architectures with which the disclosed system of methods may be implemented include, but are not limited to, those architectures described in U.S. Pat. No. 7,436,910 and U.S. Pat. No. 7,436,912, each of which is incorporated herein by reference in its entirety.

As further shown in FIG. 2, optional transmitter circuitry 226 and antenna element/s 228 may be provide for communicating raw received IQ emitter data, partially processed geolocation data, and/or determined emitter geolocation data received from signal processing circuitry 220. In this regard, it will also be understood that raw or intermediate-processed data may in one exemplary embodiment be transmitted to a signal processing circuitry on another separate platform (e.g., aircraft, ground-based vehicle, etc.) for further processing in accordance with the techniques described herein. It will also be understood that interferometer system 200 may also include additional memory (e.g., NVRAM, RAM. etc.) and/or other circuitry components that are coupled to signal processing circuitry 220 for purposes of facilitating data processing and storage. The embodiment of FIG. 2 is exemplary only, and any other configuration of fewer, additional, and/or alternative circuitry components may be employed in other embodiments that are suitable for processing signal emitter-based data to determine emitter geolocation/s in accordance with the techniques described herein.

Figure 3:
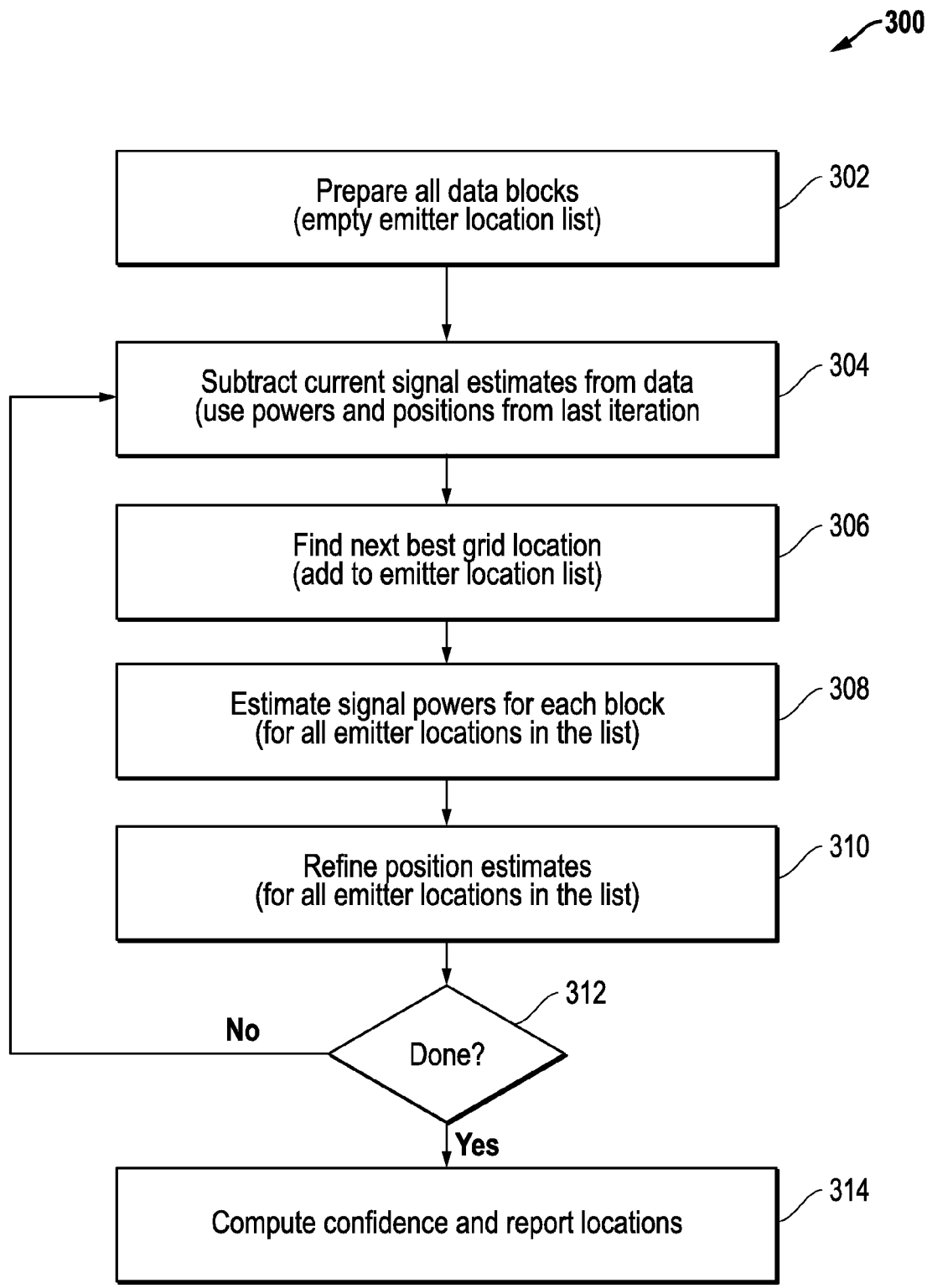
FIG. 3 illustrates methodology according to one exemplary embodiment of the disclosed systems and methods.

FIG. 3 illustrates one exemplary embodiment of a methodology 300 as it may be performed to locate radio frequency or other types of SW emitter/s using at least a single moving signal collection platform and direct emitter geolocation, e.g., such as using the system components described and illustrated in relation to FIG. 2 to perform direct IQ emitter geolocation. However, it will be understood that any other methodology (e.g., having fewer, additional and/or alternative steps as methodology 300) may be employed that is suitable for locating one or more SW emitters using one or more signal collection platforms and direct emitter location techniques as described herein.

As illustrated in FIG. 3, methodology 300 begins in a manner corresponding to step 302 of FIG. 3, with no emitter grid locations contained in an emitter location list and with no previous estimates for emitter position or power. As shown, methodology includes iterative steps 304 to 312 that may be implemented to reconstruct as much as possible from each subsequent iteration on the collected SW signal data using the power and position estimates from the previous iteration. In this regard, step 304 may be performed to subtract signal power estimates for any one or more previously identified emitter grid locations (e.g., corresponding to stronger signal peaks) from the overall collected SW signal data set to result in a new signal data set that includes all but the signal contribution of the removed stronger emitter/s previously identified. Then, in step 306 of each iteration, the grid location of the next strongest remaining emitter peak (i.e., the overall peak in the remaining collected data after the preceding step 304 that represents the best single grid location which has not already been chosen) may be identified and added to a list of identified emitters. Next, in step 308, the signal power for each emitter grid location contained in the emitter location list may be estimated, and then the position estimates for all emitters in the emitter location list may be optionally refined in step 310 as shown.

As shown in FIG. 3, steps 304 to 312 of methodology 300 may iteratively repeat until a desired or specified determination criteria is found satisfied in step 312, for example when a particular percentage of received power has been accounted for by all geolocated sources or emitters. After the last iteration occurs, methodology 300 may proceed to step 314, where location/s confidence may be computed and locations may be reported, e.g., displayed, output to storage set, etc.

I. Introduction to Geolocation Solutions

Among the examples of suitable geolocation solutions that may be employed (e.g., using the exemplary system embodiment of FIG. 2 in an SW emissions environment such as illustrated in FIG. 1) in the practice of the disclosed systems and methods are those that include, but are not limited to, a sparse-reconstruction framework for direct geolocation, a direct iterative sparse-reconstruction solution technique, and an additional technique that allow for chosen locations to be refined numerically. Examples of the latter include, but are not limited to: 1) techniques that obtain a Cramer-Rao lower bound (CRLB), which may be used to produce a confidence region, an error ellipse probable (EEP), for the solution; 2) techniques that may be implemented to improve the geolocation results by reducing quantization error after running sparse reconstruction; and 3) techniques that may be employed to improve the intermediate results during the iterations of an iterative sparse reconstruction technique.

It will be understood that the following example techniques are exemplary only, and that any other techniques or methodology may be employed that are suitable for locating signal wave (SW) emitters using one or more moving signal collection platforms and direct IQ emitter geolocation.

A. Sparse Reconstruction

One popular and well-known sparse reconstruction technique is Basis Pursuit (BP) and its variations (e.g., Basis Pursuit Denoising which allows for noisy measurements). Qualitatively speaking, BP is a specific mathematical problem formulation that (when solved by one of many available solvers) reconstructs the signal (non-noise) portion of a data vector using only a weighted sparse subset of vectors from a fixed dictionary of vectors (for additional information on BP see S. S. Chen, D. L. Donoho, and M. A. Saunders, "Atomic decomposition by basis pursuit," *SIAM Journal on Scientific Computing*, vol. 20, no. 1, pp. 33-61, 1999, which is incorporated herein by reference in its entirety). The BP formulation is not applicable to the geolocation scenarios including a single platform with no known signal modulation information due to the time variation of the array response and received signal powers that results from the long-dwell aspect of the collection scenario. Note that BP does not specify which solution method is used.

In one embodiment a geolocation scenario of interest may be posed (in one form) as a flexible mathematical sparse reconstruction problem. The disclosed problem framework may be used to allow general-purpose math solvers (including interior point methods, iteratively re-weighted least squares, etc.) to be adapted to produce a solution, it being understood that the applicability of available general-purpose solvers depends on the specific problem formulation used. The disclosed flexible sparse reconstruction framework presented herein may also be implemented to provide many additional (optional) benefits, including: allowing for outlier measurements (providing robustness), accounting for potential temporal correlation in the noise, exploiting potential temporal correlation in the signal powers, and using data compression techniques to reduce computation (which are also discussed in Section III).

One popular class of approximate solution methods for sparse-reconstruction problems are so-called greedy iterative methods (such as matching pursuit (MP) and orthogonal matching pursuit (OMP)). For additional information on greedy iterative methods see J. A. Tropp and A. C. Gilbert, "Signal recovery from random measurements via orthogonal matching pursuit," *Information Theory, IEEE Transactions on*, vol. 53, no. 12, pp. 4655-4666, 2007, which is incorporated herein by reference in its entirety. These existing iterative solution methods share similar shortcomings to the BP formulation (as described above). In contrast, the iterative technique disclosed herein may be viewed as a new iterative sparse reconstruction solution method which allows for a time-varying array response and time-varying signal powers.

It is itself flexible in implementation and may solve the sparse reconstruction problem framework described above (thus it is well-suited for solving the geolocation scenario of interest). Some of the benefits of this disclosed iterative method include its computational efficiency and that some formulations may lend well to hardware acceleration (FPGA, GPU, etc.).

II. Signal Model

The following section describes one exemplary embodiment for the creation of a statistical model of the received data, including any sources of error (calibration error, correlated noise, etc.). This section also develops a convention for representing the received data, along with the dictionaries that may be used for sparse reconstruction. Accordingly, this section defines a signal model for the received data and a mathematical convention for describing the data and processing. The exemplary embodiment of this section accounts for much of the undesirable behavior of measurements and data in real geolocation systems, but is not meant to be exhaustive. The model of this embodiment incorporates the time-varying array response due to multiple emitters and also may be implemented to account for thermal noise, navigation error, and array calibration errors.

A. Notation

As used herein, a bold font will indicate vectors and matrices. Typically lower-case bold letters will indicate vectors and upper-case bold letters will indicate matrices. For complex numbers, an asterisk superscript (e.g., x*) will indicate conjugation, a T superscript (e.g., $x^T$) will indicate a transpose, and a H superscript (e.g., $x^H$) will indicate a conjugate transpose.

The bar notation (e.g., $\bar{t}$) used in this paper will indicate variables in simpler, but less mathematically-convenient, models which will ultimately be replaced. For example, $\bar{t}$ will indicate all time, but later t will indicate time per block. Similarly $\bar{n}$ will indicate simple thermal noise, but later n will model multiple sources of noise. The bar notation should not be confused with other conventions which use a bar to indicate complex conjugation.

B. Basic Model

Consider a moving platform collecting $N_c$ channels of coherent data, each channel attached to an antenna array element. A single stationary emitter $l \in \{1, \ldots, N_e\}$ will produce a response $\bar{x} \in \mathbb{C}^{N_c}$ at the collector. Considering a long-period of time $\bar{t} \in \{1, \ldots, N_t\}$, the array response to emitter l will be a function of the emitter three-dimensional position $p_l \in \mathbb{R}^3$ and also a function of time due to the known platform position and orientation. The (noiseless) response to emitter l is given by $$\bar{x}_l(p_l, \bar{t}) = \bar{a}(p_l, \bar{t})\bar{s}_l(\bar{t}).$$

The vector $\bar{a} \in \mathbb{C}^{N_c}$ is the commonly referenced narrowband array response vector (see H. Krim and M. Viberg, "Two decades of array signal processing research: the parametric approach," *Signal Processing Magazine, IEEE*, vol. 13, no. 4, pp. 67-94, 1996, which is incorporated herein by reference in its entirety), which applies a gain and a phase to a common received signal $\bar{s}_l \in \mathbb{C}^1$. It is often assumed (for convenience, but without loss of generality) that all array-response vectors are unit length (unit $l_2$-norm). Note that this technique may be extended to wideband emitters by channelizing the received data into multiple narrowband data streams. The array response is parameterized as a function of time and (unknown) emitter position. As the platform position and orientation is assumed to be known, an emitter position and time instant maps to an azimuth, elevation and range (relative to the platform). The time parameter also allows temporal variations in the array response to be modelled. Note also that this exemplary technique does not rely on a far-field array model. The actual array response at time $\bar{t}$ is the summation of all $\bar{x}_l$ and additive noise $\bar{n} \in \mathbb{C}^{N_c}$, or $$y(p_1, \ldots, p_{N_e}, \bar{t}) = \sum_{l=1}^{N_e} \bar{x}(p_l, \bar{t}) + \bar{n}(\bar{t}).$$

This exemplary basic model may be modified as described below to aid in the solution, the estimation of all $p_l$.

C. Data Block Structure

Although the array response vectors $\bar{a}$ are continuously varying over all time $\bar{t}$, they may be considered stationary over a smaller block of time in order to simplify computation. From this point on, the data may be assumed to be divided into $N_b$ blocks, each block of which may consist of $N_s$ time samples. Any given block of data, $k \in \{1, \ldots, N_b\}$ may then be parameterized as a function of block time $t \in \{1, \ldots, N_s\}$. Note that the variable $\bar{t}$ will no longer be used since any $\bar{t}$ may be represented with a combination of t and k.

The noise $\bar{n}$, signals $\bar{s}_l$ and array response vectors $\bar{a}_l$ may similarly be divided into blocks. The new model is then $$\bar{x}_{lk}(p_l, t) = \bar{a}_k(p_l)\bar{s}_{lk}(t). \qquad (1)$$

and $$y(p_1, \ldots, p_{N_e}, t) = \sum_{l=1}^{N_e} \bar{x}_{lk}(p_l, t) + \bar{n}_k(t).$$

D. Additional Noise Sources

Narrowband direction finding (DF) systems typically collect or mathematically model the array response at many discrete combinations of azimuth and depressions (and possibly all ranges as well). A measured response is inherently noisy and the actual response may also have some amount of temporal variation (if it is not perfectly repeatable). Similarly, a modeled response may also have some amount of error. In addition to calibration errors, the platform navigation may have some amount of error.

Reasonable values of calibration and navigation error may be modeled as additive noise and a reduction in signal power. The net result is a model in which the signal fits the calibration exactly, but has an inherent reduction in SNR. The array response errors (due to both imperfect calibration and navigation error) may be modeled as $$a_k(p_l) = \sqrt{1-\delta_l^2}\,a_k(p_l) + \sqrt{\delta_l^2}\,u_k.$$

The additive array response errors need not be temporally-uncorrelated nor Gaussian, as the overall noise covariance model may be accounted for in the final solution method. The model (1) then may be written as $$y_k(p_1, \ldots, p_{N_e}, t) = \sum_{l=1}^{N_e} \left(\sqrt{1-\delta_l^2}\,a_k(p_l) + \delta_l u_k\right)\bar{s}_{lk}(t) + \bar{n}_k(t)$$

$$= \sum_{l=1}^{N_e} \underbrace{a_k(p_l)\sqrt{1-\delta_l^2}\,\bar{s}_{lk}(t)}_{s_{lk}(t)} + \underbrace{\sum_{l=1}^{N_e} \delta_l u_k s_{lk}(t) + \bar{n}_k(t)}_{n_k(t)}.$$

The array response errors u and thermal noise $\bar{n}$ may be combined as $$n_k(t) = \sum_{l=1}^{N_e} \delta_l u_k s_{lk}(t) + \bar{n}_k(t).$$

Similarly, the signal models may then be represented as $$s_{lk}(t) = \sqrt{1-\delta_l^2} \bar{s}_{lk}(t).$$

The overall model, with these substitutions, will be constructed in the following section.

E. Final Array Model

The (unknown) signals from each emitter may be represented with the vector function $s_k \in \mathbb{C}^{N_e}$ as $$s_k(t) = [s_{1k}(t), \ldots, s_{N_e k}(t)]^T.$$

The unknown true array response vectors may be represented with the matrix $A_k \in \mathbb{C}^{N_c \times N_e}$ as $$A_k = [a_k(p_1), \ldots, a_k(p_{N_e})].$$

In one exemplary embodiment, the overall model, with the substitutions from the previous section, is $$x_{lk}(p_l, t) = a_k(p_l) s_{lk}(t) \quad (2)$$

and $$y_k(p_1, \ldots, p_{N_e}, t) = \sum_{l=1}^{N_e} x_{lk}(p_l, t) + n_k(t) \quad (3)$$

$$= A_k(p_1, \ldots, p_{N_e}) s_k(t) + n_k(t).$$

This is essentially the same as the previous model (1), but with an overall drop in SNR and noise that is no longer necessarily additive white Gaussian noise (AWGN).

The model (3) may also be represented in matrix notation. All $N_s$ multi-channel samples from $y_k(t)$ in each block k may be collected into a matrix $Y_k \in \mathbb{C}^{N_c \times N_s}$. The unknown multi-channel noiseless signal information samples from $x_k(t)$ may be represented with matrix $X_k \in \mathbb{C}^{N_c \times N_s}$, and the unknown multi-channel noise samples from $n_k(t)$ may be represented with the matrix $N_k \in \mathbb{C}^{N_c \times N_s}$. The unknown multi-emitter signal samples from $s_k(t)$ may be represented with the matrix $S_k \in \mathbb{C}^{N_e \times N_s}$. With all of these matrices, the matrix version of the signal model from (2) and (3) is $$X_k(p_l) = A_k(p_l) S_k \quad (4)$$

and $$Y_k(p_1, \ldots, p_{N_e}) = X_k(p_1, \ldots, p_{N_e}) + N_k \quad (5)$$

$$= A_k(p_1, \ldots, p_{N_e}) S_k + N_k$$

F. Generalized Noise Distribution

Up to this point, no structure was imposed on the noise. As described further herein, a multivariate extension of the Generalized Normal distribution (one example version is defined in S. Nadarajah, "A generalized normal distribution," *Journal of Applied Statistics*, vol. 32, no. 7, pp. 685-694, 2005, which is incorporated herein by reference in its entirety), may be used at times if desired. This distribution is convenient in that in includes both the standard multivariate normal distribution and a multivariate Laplace distribution (one example version is defined in T. Eltoft, T. Kim, and T.-W. Lee, "On the multivariate laplace distribution," *Signal Processing Letters, IEEE*, vol. 13, no. 5, pp. 300-303, 2006, which is incorporated herein by reference in its entirety). The Laplace distribution is a classical noise model used to improve the robustness of an estimator. The classical least absolute deviation (LAD) may be shown statistically to be an optimal estimator with Laplace-distributed noise, whereas the minimum mean-squared error (MMSE) estimator is statistically an optimal estimator for Normal-distributed noise, although any suitable distribution model may be employed. Furthermore, the multivariate Laplace distribution may play an important role in sparse-reconstruction techniques. In one exemplary embodiment, a multivariate generalized normal (MGN) density may be employed as further described, but the full density is not required. For a given MGN-distributed random vector $z \in \mathbb{C}^{N_z}$ that for a given true noise covariance $R_z \in \mathbb{C}^{N_z \times N_z}$, where $R_z^H = R_z$, with factorization $$F_z^{-H} F_z^{-1} = R_z^{-1},$$

the MGN density has the property $$f_{MGN}(z, \mu_z, R_z, q) \propto \exp[-\|F_z^{-1}(z - \mu_z)\|_q^q],$$

where q=2 corresponds to the standard multivariate normal and q=1 corresponds to the multivariate Laplace distribution. This density may also be written using a weighted quadratic form for any q using the diagonal weight matrix $W \in \mathbb{R}^{N_z \times N_z}$ with $$W_{ii}(\phi, q) = \text{daig}(|\phi_i|^{q/2})$$

and the vector $\tilde{z} \in \mathbb{C}^{N_z}$ defined as $$\tilde{z} = F_z^{-1}(z - \mu),$$

then $$f_{MGN}(z, \mu_z, R_z, q) \propto \exp[-\|\tilde{z}\|_q^q]$$

$$\propto \exp\left[-\left\|W^{\frac{1}{2}}(\tilde{z}, q)\tilde{z}\right\|_2^2\right].$$

G. Quantized Positions

The emitter locations may be quantized to a discrete set of locations. This quantization may be in the form of a regular grid. It may be full three dimensions, or it may be restricted to a two-dimensional surface in three-dimensional space (e.g., using WGS84 earth model or DTED digital terrain data to determine altitude for a given latitude and longitude pair). Each discrete potential location $m \in \{1, \ldots, N_l\}$ may have an associated position $\tilde{p}_m \in \mathbb{R}^3$. Note that higher-dimensional extensions are also possible where appropriate (e.g., to model a quantized set of velocity components). All of these positions may be used to form a dictionary of array response vectors $M_{a,k} \in \mathbb{C}^{N_c \times N_l}$ for each block (k) as $$M_{a,k} = [a_k(\tilde{p}_1), \ldots, a_k(\tilde{p}_{N_l})]. \quad (6)$$

The actual solutions may be any of various techniques suitable for reconstruction all $R_{y,k}$ using a small subset of the vectors in $M_{a,k}$. As further described herein, a covariance-fitting technique will be introduced. For these methods it may be convenient to form a dictionary of array response vector outer products. Each outer product at time k for emitter position Tri, may itself be vectorized as $$r_{A,k}(\tilde{p}_m) = \text{vect}(a_k(p_l)). \quad (7)$$

The dictionary of signal covariances is then $$M_{r_{a,k}} = [r_{A,k}(\tilde{p}_1), \ldots, r_{A,k}(\tilde{p}_{N_t})]. \quad (8)$$

Note that $M_{a,k}$ may be complex-valued or separated into the real and imaginary components. Since the covariances should be hermitian, only the upper- or lower-triangular part is needed. If the dictionary is divided into real and imaginary parts, the imaginary part of the diagonal values should be zero. Thus, two examples for the dictionaries are $M_{r_{a,k}} \in \mathbb{C}^{(\frac{1}{2}(N_c^2 + N_c)) \times N_t}$ or $M_{r_{a,k}} \in \mathbb{R}^{N_c^2 \times N_t}$.

III. Single Block Processing

This section is provided as an example statistical justification for the overall framework that will be presented in Section IV below as well as an example statistical justification for the decisions made in the example algorithms in Section IV below. As indicated in the introduction Section I, this section is exemplary only and in no way is meant to preclude the use of other suitable models, assumptions, heuristics or solutions where appropriate. Note: Since this section only considers each block of data individually (single block of data), these techniques will not provide a geolocation on their own, but these techniques will be extended into a joint solution for multi-data block geolocation solutions and final sparse reconstruction formulations in Section IV herein.

A. Maximum Likelihood Signal Estimate with Correlated Gaussian Noise

Given (4) and (5) and assuming a multivariate normal (MN) noise distribution with a covariance matrix $R_{n,k}^{-1} = F_{n,k}^{-H} F_{n,k}^{-1}$ that is not necessarily diagonal, where $R_{n,k} \in \mathbb{C}^{N_c}$ and $R_{n,k} = R_{n,k}^H$, then $$p(Y_k | S_k) = \prod_{t=1}^{N_s} f_{MGN}(y_k(t) - A_k s_k(t), 0, R_{n,k}, 2) \quad (9)$$

$$\propto \prod_{t=1}^{N_s} \exp[-\|F_{n,k}^{-1}(y_k(t) - A_k s_k(t))\|_2^2]$$

$$= \exp\left[-\sum_{t=1}^{N_s} \|F_{n,k}^{-1}(y_k(t) - A_k s_k(t))\|_2^2\right]$$

$$\propto \exp[-\|F_{n,k}^{-1}(Y_k - A_k S_k)\|_F^2].$$

The ML estimate is equivalent to the Gauss-Markov (GM) estimator, which is well known to be $$\underset{S_k}{\mathrm{argmax}}\, p(Y_k | S_k) = (A_k^H R_{n,k}^{-1} A_k)^{-1} A_k^H R_{n,k}^{-1} Y_k.$$

Note that for uncorrelated noise (e.g., $R_{n,k} = I\sigma_n^2$), the GM estimate is simply the MMSE solution.

B. Maximum Signal Likelihood Using Compressed Data

This section will show that the data matrix $Y_k$ may be optionally compressed using the singular value decomposition (SVD). While the solutions may not be identical, the complexity is greatly reduced while still approximately a ML estimator. SVD-based data compression is a well-known technique (see D. Malioutov, M. Çetin, and A. S. Willsky, "A sparse signal reconstruction perspective for source localization with sensor arrays," *IEEE Transactions on Signal Processing*, vol. 53, no. 8, pp. 3010-3022, 2005, which is incorporated herein by reference in its entirety). It will be understood that the optional use of a compressive sensing (CS) array may preclude the need for data compression in some cases, but the use of data compression techniques does not preclude the use of a CS array (data compression techniques may optionally be used in place of or in conjunction with a CS array).

Given the SVD of data block $Y_k$ as $$U_k L_{full,k} V_{full,k} = Y_k,$$

where $U_k \in \mathbb{C}^{N_c \times N_c}$ are the orthonormal matrix of left-singular vectors, $L_{full,k} \in \mathbb{C}^{N_c \times N_s}$ the sparse full matrix of singular values, and $V_{full,k} \in \mathbb{C}^{N_s \times N_s}$ the full orthonormal matrix of right-singular vectors.

Typically, the full set of right singular vectors are not computed since $$L_{full,k} = [L_k | 0_{N_s \times (N_c - N_s)}]$$

with the diagonal square matrix of singular values $L_k \in \mathbb{R}^{N_c \times N_c}$, then an equivalent decomposition is performed as $$U_k L_k V_k = Y_k$$

with the tall matrix of active right singular vectors $V_k \in \mathbb{C}^{N_s \times N_c}$. These reduced singular vectors may be used to (losslessly) compress the data $$Y_{V,k} = Y_k V \quad (10)$$

and solution as $$S_{V,k} = S_k V.$$

Since the solution and data may now be reduced to $\{Y_{V,k}, S_{V,k}\} \in \mathbb{C}^{N_c \times N_c}$, the computational complexity has been drastically reduced. Note that $Y_{V,k}$ may also be computed using an eigen-decomposition of the sample covariance matrix for $Y_k$.

The modified likelihood from (9) for $S_k$ is now $$p(Y_{V,k} | S_{V,k}) \propto \exp[-\|F_{n,k}^{-1}(Y_{V,k} - A_k S_{V,k})\|_F^2]. \quad (11)$$

This ML estimate is equivalent to the Gauss-Markov estimator, which is now $$\underset{S_{V,k}}{\mathrm{argmax}}\, p(Y_{V,k} | S_{V,k}) = (A_k^H R_{n,k}^{-1} A_k)^{-1} A_k^H R_{n,k}^{-1} Y_{V,k}.$$

Note that if $V_{full,k}$ is used in place of $V_k$ in (10), then the estimates are identical and a full estimate of $S_k$ may be produced since $$\underset{S_k}{\mathrm{argmax}} \|F_{n,k}^{-1}(Y_k - A_k S_k)\|_F^2 = \left[\underset{S_k V_{full,k}}{\mathrm{argmax}} \|F_{n,k}^{-1}(Y_k - A_k S_k) V_{full,k}\|_F^2\right] V_{full,k}^H.$$

Since the full $V_{full,k}$ is not used, the noise realization is modified as $$N_{V,k} = N_k V.$$

This compressed problem may be useful with sparse reconstruction formulations to reduce complexity.

C. Maximum a Posteriori Signal Estimation

The maximum a posteriori (MAP) estimator may be viewed as ML estimation which also incorporates additional prior information about the solution. This may be derived from Bayes' theorem which has the property $$p(S_k | Y_k) \propto p(Y_k | S_k) p(S_k).$$

If a prior multivariate normal density for each $s_k(t)$ is provided as $$p(s_k(t)) = f_{MGN}(s_k(t), \mu_s, R_{s,k}, 2). \quad (12)$$

The prior mean is $\mu_s \in \mathbb{C}^{N_s}$ and the prior solution covariance $R_{s,k} \in \mathbb{C}^{N_s \times N_s}$, where $R_{s,k}^H = R_{s,k}$, which may be factorized as $$F_s^{-H} F_s^{-1} = R_s^{-1}.$$

For the entire block of data $$p(S_k) \propto \exp[-F_{s,k}^{-1}(S_k - M_s)],$$

with the prior matrix mean $M_s \in \mathbb{C}^{N_c \times N_s}$. The MAP estimate of $S_k$ (using both (9) and (12)) is now $$\operatorname*{argmax}_{S_k} p(S_k \mid Y_k) = \operatorname*{argmax}_{S_k} p(Y_k \mid S_k) p(S_k) \quad (13)$$

$$= \operatorname*{argmin}_{S_k} -\log[p(Y_k \mid S_k) p(Y_k S_k)]$$

$$= \operatorname*{argmin}_{S_k} \|F_{n,k}^{-1}(Y_k - A_k S_k)\|_F^2 + \|F_{s,k}^{-1}(S_k - M_s)\|_F^2.$$

This MAP estimate is essentially a regularized version of the Gauss-Markov estimator from Section III-A and is given by $$\operatorname*{argmax}_{S_k} p(Y_k \mid S_k) = (A_k^H R_{n,k}^{-1} A_k + R_{s,k}^{-1})^{-1} (A_k^H R_{n,k}^{-1} Y_k + R_{s,k}^{-1} M_s).$$

D. Sparse Reconstruction Solutions

Consider that the true array response vectors $A_k$ are unknown, but that they are (roughly) a subset in a large dictionary of vectors, as defined in (6). In this case the signal portion of $y_k(t)$ from (4) and (5) may be represented as $$A_k s_k(t) = M_{a,k} c_k(t).$$

The vector $c_k(t) \in \mathbb{C}^{N_l}$ is a sparse vector that selects and scales certain columns of $M_{a,k}$. To model the sparse nature of $c_k$, each element $c_{mk}(t)$ may be modeled as uncorrelated multi-variate Laplace (as defined in Section II-F), each with variance $\sigma_c^2$. Note that since $c_k(t)$ is complex, the simple Laplace distribution is not applicable. The Laplace distribution used here is symmetric in the IQ plane and has a heavy tail away from the origin. Note that without this prior information, the problem would be underdetermined (more unknown coefficients than data samples).

The prior density is $$p(c_k(t)) = f_{MGN}(c_k(t), 0, I\sigma_c^2, 1) \quad (14)$$

$$\propto \prod_{m=1}^{N_l} \exp\left[-\frac{1}{\sigma_c} |c_{mk}(t)|\right]$$

$$\propto \exp\left[-\frac{1}{\sigma_c} \|c_k(t)\|_1^1\right]$$

and the likelihood (density on the noise or residual) is $$p(y_k(t) \mid c_k(t)) = f_{MGN}(y_k(t) - M_{a,k} c_k(t), 0, R_{n,k}, q) \propto \exp[-\|F_{n,k}^{-1}(y_k(t) - M_{a,k} c_k(t))\|_q^q].$$

The noise may be modeled as either multivariate Gaussian (by setting q=2) or multivariate Laplace (by setting q=1) if robustness is needed.

The MAP solution for this problem, from (13), is now $$\operatorname*{argmax}_{c_k(t)} p(c_k(t) \mid y_k(t)) = \operatorname*{argmax}_{c_k(t)} p(y_k(t) \mid c_k(t)) p(c_k(t)) \quad (15)$$

$$= \operatorname*{argmin}_{c_k(t)} \|F_{n,k}^{-1}(y_k(t) - M_{a,k} c_k(t))\|_q^q +$$

$$\frac{1}{\sigma_c} \|c_k(t)\|_1^1.$$

Note that for i.i.d. noise and q=2, this reduces to the standard basis pursuit (BP) formulation $$\operatorname*{argmax}_{c_k(t)} p(c_k(t) \mid y_k(t))|_{R_{n,k} = I\sigma_n^2, q=2} = \operatorname*{argmin}_{c_k(t)} \frac{1}{\sigma_n^2} \|y_k(t) - M_{a,k} c_k(t)\|_2^2 +$$

$$\frac{1}{\sigma_c} \|c_k(t)\|_1^1.$$

$$= \operatorname*{argmin}_{c_k(t)} \|y_k(t) - M_{a,k} c_k(t)\|_2^2 +$$

$$\lambda \|c_k(t)\|_1^1,$$

where the statistically-optimal Lagrange multiplier $\lambda$ is determined from the variances on the noise and the prior.

E. Multi-Dimensional Reconstruction Solutions

This section will extend the basic solution from Section III-D to a joint estimation of multiple time samples (within a single data block). This technique will use the data compression approaches of Section III-B. As mentioned in Section III-D, a complex-valued sparse prior implies a multivariate Laplace distribution (within a MAP formulation) for each solution vector element.

The joint multivariate Laplace from (14) may be written as a mixed norm using the real and imaginary parts ($c_{re,mk}(t)$ and $c_{im,mk}(t)$, respectively) as $$\exp\left[-\frac{1}{\sigma_c} \sum_{m=1}^{N_l} |c_{mk}(t)|\right] = \exp\left[-\frac{1}{\sigma_c} \sum_{m=1}^{N_l} \sqrt{c_{re,mk}^2(t) + c_{im,mk}^2(t)}\right]$$

$$= \exp\left[-\frac{1}{\sigma_c} \sum_{m=1}^{N_l} \|[c_{re,mk}(t), c_{im,mk}(t)]\|_2\right]$$

$$= \exp\left[-\frac{1}{\sigma_c} \|[c_{re,k}(t), c_{im,k}(t)]\|_{[1,2]}\right]$$

where the mixed matrix norm $\|\bullet\|_{[1,2]}$ is an $l_2$-norm (not squared) along dimension two, followed by an $l_1$-norm on the resulting vector, or $$\|Z\|_{p,2}^p = \sum_r \left(\sum_c |Z_{r,c}|^2\right)^{p/2}. \quad (16)$$

This mixed norm approach may be justified heuristically by noting that the $l_2$-norm does not impose sparsity on the solution as with the $l_1$-norm. Using an $l_1$-norm on all the elements of a matrix would make the solution each row of $c_k(t)$ either predominantly real or predominantly imaginary.

The data compression techniques of Section III-B represent all the time samples of array data for a single block of data with an $N_c$-by-$N_c$ factorization. The columns of this matrix correspond to data subspace dimensions and the rows correspond to array channels. The likelihood from (11) may be written in terms of a multi-dimensional coefficient vector $C_{V,k} \in \mathbb{C}^{N_l \times N_c}$. Each row of $C_{V,k}$ may now be modeled as a multivariate Laplace, which is itself simply an extension of the complex Laplace distribution to a higher-dimensional space. The joint prior density may be expressed as $$p(C_{V,k}) \propto \exp\left[-\frac{1}{\sigma_c}\|C_{V,k}\|_{[1,2]}\right]. \quad (17)$$

If the noise is similarly modeled as multi-variate Laplace for robustness then $$p(Y_{V,k}|C_{V,k}) \propto \exp[-\|F_{n,k}^{-1}(Y_{V,k}-M_{a,k}C_{V,k})\|_{[1,2]}].$$

The prior (17) assumes that all channels are i.i.d. If the channels have some correlation $R_{c,k} \in \mathbb{C}^{N_c \times N_c}$ with factorization $F_{c,k}^{-H} F_{c,k}^{-1} = R_{c,k}^{-1}$, where $R_{c,k}^H = R_{c,k}$, then $$p(C_{V,k}) \propto \exp[-\|C_{V,k} F_{c,k}^{-H}\|_{[1,2]}]. \quad (18)$$

This may be interpreted as joint density with a pre-whitened version of $C_{V,k}$, where the pre-whitening is applied to the rows of $C_{V,k}$.

The final multi-dimensional MAP solution is then $$\begin{aligned}\operatorname*{argmax}_{C_{V,i}} p(C_{V,k}|Y_{V,k}) &= \operatorname*{argmax}_{C_{V,k}} p(Y_{V,k}|C_{V,k}) p(C_{V,k}) \quad (19) \\ &= \operatorname*{argmin}_{C_{V,k}} -\log[p(Y_{V,k}|C_{V,k}) p(C_{V,k})] \\ &= \operatorname*{argmin}_{C_{V,k}} \|F_{n,k}^{-1}(Y_{V,k} - M_{a,k} C_{V,k})\|_{[1,2]} + \\ &\quad \|C_{V,k} F_{c,k}^{-H}\|_{[1,2]}.\end{aligned}$$

Although variety of general-purpose solution methods to problems of type (19) may be available (some examples may include interior point methods, iteratively-reweighted least squares (IRLS), and greedy iterative methods) a solution to (19) will not produce a geolocation since it represents only a single block of data. This formulation will be extended in Section IV to account for multiple blocks of data, which will allow a geolocation. The covariances $R_{c,k}$ and $R_{n,k}$ may be also extended to also account for correlation between blocks. Solution methods which may be employed for solution of the extended formulations is also discussed Section IV.

F. Uncorrelated Signal Covariance Reconstruction

This section will derive exemplary statistically-optimal estimators assuming that all signals $s_{lk}(t)$ are uncorrelated, using some approximations, it being understood that any suitable estimator/s may alternatively be employed. Defining the real-valued, diagonal matrix of signal powers $\Sigma_{s,k}^2 \in \mathbb{R}_{>0}^{N_e \times N_e}$ at block k as $$\Sigma_{s,k}^2 = \operatorname{diag}(\sigma_{s,k}^2),$$

with the real-valued vector of signal powers $\sigma_{s,k}^2 \in \mathbb{R}_{\geq 0}^{N_s}$ for block k. The expectation value for the signal covariance matrix $\hat{R}_{s,k} \in \mathbb{C}^{N_e \times N_e}$, where $\hat{R}_{s,k}^H = \hat{R}_{s,k}$, may be modeled as $$\begin{aligned}\hat{R}_{s,k} &= E[s_k s_k^H] \\ &= \sum_{s,k}^2\end{aligned}$$

$$= \operatorname{diag}(\sigma_{s,k}^2).$$

With signals and noise uncorrelated, the covariance matrix formed from (5) is then $$\begin{aligned}R_{y,k} &= \frac{1}{N_s} Y_k Y_k^H \\ &\approx \frac{1}{N_s} X_k X_k^H + \frac{1}{N_s} N_k N_k^H \\ &= \frac{1}{N_s} A_k S_k S_k^H A_k^H + R_{n,k} \\ &= A_k R_{s,k} A_k^H + R_{n,k},\end{aligned}$$

with sample covariance matrices $R_{y,k}, R_{x,k}, R_{n,k} \in \mathbb{C}^{N_e \times N_e}$ and $R_{s,k} \in \mathbb{C}^{N_e \times N_e}$. Note that $R_{y,k}^H = R_{y,k}$, $R_{x,k}^H = R_{x,k}$, $R_{n,k}^H = R_{n,k}$ and $R_{s,k}^H = R_{s,k}$.

If the signals and noise are assumed to be Gaussian distributed then both $R_{n,k}$ and $R_{s,k}$ will have a Wishart distribution. The Wishart distribution may itself be approximated with a multivariate Gaussian distribution, if $N_s$ is reasonably large (using the central limit theorem). Using the uncorrelated signal model and assuming that all signal powers are all roughly the same ($\hat{\sigma}_{s,k}$) then the sample covariance has the (approximate) distribution $$R_{s,k} \sim W_{N_e}\left(\sum_{s,k}^2, N_s\right) \approx \mathcal{N}_c\left(\sum_{s,k}^2, N_s I \hat{\sigma}_{s,k}^4\right). \quad (20)$$

Without loss of generality, the noise will be modeled as AWGN. If the noise is not AWGN, the data (and array response vectors) may be pre-whitened using $$F_{n,k}^{-H} F_{n,k}^{-1} = E[N_k N_k^H]^{-1},$$

and the same noise model is then applicable. The noise is then $$R_{n,k} \sim W_{N_c}(I\hat{\sigma}_{n,k}^2, N_s) \approx \mathcal{N}_c(I\hat{\sigma}_{n,k}^2, N_s I \hat{\sigma}_{n,k}^4). \quad (21)$$

Combining (20) and (21) is then approximately distributed as $$R_{y,k} \sim \mathcal{N}_c(A_k \Sigma_{s,k}^2 A_k^H + I \hat{\sigma}_{n,k}^2, N_s(\hat{\sigma}_{s,k}^4 A_k A_k^H + \hat{\sigma}_{n,k}^4 I)). \quad (22)$$

As before, the MAP estimate is then $$\begin{aligned}\operatorname*{argmax}_{\sigma_{s,k}^2} p(\sigma_{s,k}^2 | R_{y,k}) &= \operatorname*{argmax}_{\sigma_{s,k}^2} p(R_{y,k} | \sigma_{s,k}^2) p(\sigma_{s,k}^2) \\ &= \operatorname*{argmin}_{\sigma_{s,k}^2} -\log[p(R_{y,k}|\sigma_{s,k}^2)] - \log[p(\sigma_{s,k}^2)]\end{aligned}$$

which using the factorization of the inverse of the covariance term from (22) formed as $$F_{R_y,k}^{-H} F_{R_y,k}^{-1} = (N_s \hat{\sigma}_{s,k}^4 A_k A_k^H + N_s \hat{\sigma}_{n,k}^4 I)^{-1}.$$

leads to the estimate $$\operatorname*{argmax}_{\sigma_{s,k}^2} p(\sigma_{s,k}^2 \mid R_{y,k}) = \tag{23}$$

$$\operatorname*{argmin}_{\sigma_{s,k}^2} \left\| F_{R_{y,k}}^{-1}\left(R_{y,k} - I\hat{\sigma}_{n,k}^2 - A_k \sum_{s,k}^2 A_k\right) \right\|_F^2 - \log[p(\sigma_{s,k}^2)],$$

as was done in sec II-G.

Note that the prior on $\sigma_{s,k}^2$ is flexible. It may be modeled as a gamma distribution since it is non-negative. But it may also be modeled as a Gaussian distribution which leads to a linear problem. The prior distribution is helpful if the problem becomes underdetermined.

If $\hat{\sigma}_{s,k}^4 \gg \hat{\sigma}_{n,k}^4$ and $E[A_k A_k^H] \approx I$, then the estimate (23) may be approximated with $$\operatorname*{argmax}_{\sigma_{s,k}^2} p(\sigma_{s,k}^2 \mid R_{y,k}) = \tag{24}$$

$$\operatorname*{argmin}_{\sigma_{s,k}^2} \frac{1}{\hat{\sigma}_{s,k}^4} \left\| \left(R_{y,k} - I\hat{\sigma}_{n,k}^2 - A_k \sum_{s,k}^2 A_k\right) \right\|_F^2 - \log[p(\sigma_{s,k}^2)]$$

The solution to (24) is straightforward as the problem is linear. To see this, vectorize the data covariance as $$r_{y,k} = \operatorname{vect}(R_{y,k}), \tag{25}$$

and the noise covariance as $$r_{n,k} = \operatorname{vect}(I\hat{\sigma}_{n,k}^2)$$

The estimate in (24) may then be re-written as $$\operatorname*{argmax}_{\sigma_{s,k}^2} p(\sigma_{s,k}^2 \mid R_{y,k}) = \tag{26}$$

$$\operatorname*{argmin}_{\sigma_{s,k}^2} \frac{1}{\hat{\sigma}_{s,k}^4} \|r_{y,k} - r_{n,k} - [r_{A,k}(p_1), \ldots r_{A,k}(p_{N_e})]\sigma_{s,k}^2\|_2^2 -$$

$$\log[p(\sigma_{s,k}^2)],$$

using (7). Once again, if the prior density is modeled as Gaussian, then (26) is a simple (regularized) least-squares estimation problem.

G. Sparse Covariance Reconstruction

As was done in Section III-D, the MAP estimation problem (26) may be rewritten as a sparse reconstruction problem. In this particular example, this method still assumes that all signals are uncorrelated. In this formulation, the coefficient vector will have the same prior-density as (14), but should now be non-negative, real-valued $c_k \in \mathbb{R}_{>0}^{N_l}$ and only one coefficient vector is needed for the entire block. The likelihood is now $$p(r_{y,k} \mid c_k) \propto \exp\left[-\frac{1}{\hat{\sigma}_{n,k}^4} \|r_{y,k} - r_{n,k} - M_{r_a,k} c_k\|_2^2\right], \tag{27}$$

using the dictionary from (8). The final sparse reconstruction problem is then $$\operatorname*{argmax}_{c_k} p(c_k \mid r_{y,k}) = \operatorname*{argmax}_{c_k} p(r_{y,k} \mid c_k) p(c_k) \tag{28}$$

$$= \operatorname*{argmin}_{c_k} - \log[p(r_{y,k} \mid c_k) p(c_k)]$$

$$= \operatorname*{argmin}_{c_k} \frac{1}{\hat{\sigma}_{n,k}^4} \|r_{y,k} - r_{n,k} - M_{r_a,k} c_k\|_2^2 + \frac{1}{\sigma_c} \|c_k\|_1^2$$

This solution may be viewed as sparse reconstruction applied to covariance estimation. Robustness may be added heuristically by using an $l_1$-norm on the likelihood (27). As with the formulation in Section III-E, however, a solution of (28) does not produce a geolocation. This formulation will be extended in Section IV to process multiple blocks of data jointly, which will allow for a geolocation solution. Note that it is desirable for solution methods employed to produce a non-negative solution vectors, as the solutions themselves correspond to power (which should be non-negative).

IV. Joint Position Estimation Algorithms

This section will use and extend the single-data block estimation techniques (and notation used therewith) from the previous section to a multi-data block geolocation estimation framework that may be employed to determine emitter geolocation using multiple blocks of data.

Among other things, this section will

1. Derive an exemplary general-purpose sparse-reconstruction framework which may be solved by a variety of approaches.

2. Describe an example iterative technique that solves the problem.

3. Describe an optional position refinement technique that may be used to address the quantization of potential emitter locations. This may be used after sparse reconstruction to improve geolocation accuracy, improve the performance of iterative techniques, and may lead to confidence information (and EEP).

A. Sparse Reconstruction Solution Framework

In one embodiment, the location of all emitter positions using sparse-reconstruction techniques on all the data blocks may be described heuristically as finding a "sparse" set of locations that "best" reconstructs all the received data. One example statistically-optimal formulation from a single block was shown in Section III-D and Section III-E. In this embodiment, the problem was formulated as a multi-dimensional estimation problem since the true array response vectors for the emitters span a $N_e$-dimensional subspace of the $N_c$-dimensional data. This example multi-dimensional formulation will be extended further here to account for multiple blocks of data. The exemplary formulation of this section may use collected data in a variety of forms, including: 1) the raw SW emitter data (with the optional use of the data compression techniques of Section III-B) or 2) covariance matrices as described in Section III-G. Note that a CS array may optionally be used regardless of the format of the data used. Note also that the optional SVD-based data compression techniques in Section III-B may be applied to all blocks jointly, or the SVD-based compression may be applied to each block individually.

There is flexibility in the structure of the data and the structure of the solution matrices. Setting aside the specifics of the structure of all the matrices, (19) may be extended to a multi-block sparse-reconstruction problem of the form $$\underset{c_1,\ldots,c_{N_e}}{\operatorname{argmin}} \|F_n^{-1}(Y - MC_{ser})\|_{[q,2]}^q + \|C_{par}F_c^{-H}\|_{[1,2]}^1. \qquad (29)$$

The matrix of coefficients for each block $C_k$ to solve for may be concatenated in series in $C_{ser}$ as $$C_{ser} = [C_1^T | C_2^T | \ldots | C_{N_b}^T]^T$$

and in parallel in $C_{par}$ as $$C_{par} = [C_1 | C_2 | \ldots | C_{N_b}]$$

Note that in (29) the coefficient matrices $\{C_1, \ldots, C_{N_b}\}$ are combined both in serial and in parallel, and thus (29) may not be solvable with standard BP solvers (possibly including those that are designed for multi-dimensional solution matrices).

It will be understood that the formulation in (29) does not imply that all available data blocks must be used. Optionally, a subset of all available blocks of data may be processed with (29), then that solution used as additional prior information when using (29) on a subset of the remaining unused data blocks. This optional embodiment may be beneficial to reduce computation for scenarios in which the number of collected data blocks is continuously growing (a similar scenario may motivate the use of a Kalman filter when geolocation observables are used). It will also be understood that the solution to (29) provides a sparsity pattern that may allow the data to be further decomposed into the original SW emissions, which may achieve similar results to adaptive beamforming.

This method does not assume or require that the array response vectors are constant over all blocks. The overall dictionary may be seen as a combination of the dictionaries $\tilde{M}_k$ for each block. They may be combined diagonally as $$M = \begin{bmatrix} \tilde{M}_1 & & & \\ & \tilde{M}_2 & & \\ & & \ddots & \\ & & & \tilde{M}_{N_b} \end{bmatrix}.$$

The data (in its various forms) from each block ($\tilde{Y}_k$) is concatenated serially as $$Y = [\tilde{Y}_1^T | \tilde{Y}_2^T | \ldots | \tilde{Y}_{N_b}^T]^T$$

The unknown noise realization ($Y - MC_{ser}$) is represented as $$N = [N_1^T | N_2^T | \ldots | N_{N_b}^T]^T$$

The matrix $F_n^{-1}$ arises from the statistically-optimal MAP estimation model used to derive (19), although any other suitable estimation models may be employed. Heuristically, it captures the spatial and temporal correlation of the noise with $$F_n^{-H} F_n^{-1} = E[NN^H]^{-1},$$

when available. The matrix $F_c^{-1}$ also arises from the statistically-optimal MAP estimation model used to derive (19). Heuristically, it captures the temporal correlation of the signal powers with $$F_c^{-H} F_c^{-1} = E[C_{par}^H C_{par}]^{-1}.$$

The mixed norm in (29) is defined in (16); it may work for Gaussian noise with q=2, or it may provide robustness (by modeling the noise as Laplace-distributed) with q=1. All that remains is the formulation for each $\tilde{Y}_l$ in Y and each $\tilde{M}_l$ in M.

Although the data may be represented in many forms, two specific examples are described.

The first option for Y and M is to extend the techniques from (19) using a compressed version of each data block $Y_k$. Setting each $\tilde{Y}_k$ to $Y_{V,k}$ from (10), and setting $\tilde{M}_k$ to $M_{a,k}$ from (6), yields an overall problem with $Y \in \mathbb{C}^{(N_c N_b) \times N_c}$, $M \in \mathbb{C}^{(N_c N_b) \times (N_l N_b)}$, and each $C_k \in \mathbb{C}^{N_l \times N_c}$. As previously stated, this method may be solved with a variety of techniques including IRLS and convex quadratic program solvers.

A second option for Y is to use a vectorized version of the covariance data for each block. The covariance itself, rather than a factorization, is reconstructed. As in previous sections, only the upper (or optionally lower) unique triangular part of the covariance will be kept, and both the real and imaginary parts will be separated. Each $\tilde{Y}_k$ will be based on the non-zero parts of $r_{y,k}$ from (25) and each $\tilde{M}_k$ will be based on the non-zero parts of $M_{r_{a,k}}$ from (8). See Section II-G for more information on this vectorization. This yields an overall problem with $Y \in \mathbb{R}_{>0}^{N_c^2}$, $M \in \mathbb{R}_{\geq 0}^{N_c^2 \times N_b}$, and each $C_k \in \mathbb{R}_{>0}^{N_l}$. Note that the solution C should be non-negative as II) it is related to power. As previously-mentioned this is a real-valued linear program that may be solved efficiently with linear program solvers such as the well-known simplex algorithm. For additional information on the simplex method, see G. B. Dantzig and M. N. Thapa, *Linear Programming: 1: Introduction*, vol. 1, pp. 63-98, Springer, 1997, which is incorporated herein by reference in its entirety. Note that for solutions methods involving IRLS solvers, the solution will not necessarily be non-negative. There are extensions of IRLS to non-negative solutions (for example in P. D. O'Grady and S. T. Rickard, "Compressive sampling of non-negative signals," in *Machine Learning for Signal Processing, 2008. MLSP 2008. IEEE Workshop on*, pp. 133-138, IEEE, 2008, which is incorporated herein by reference in its entirety). Additionally, a multivariate gamma distribution my be optionally used for the solution coefficients, then solved with a variational Bayes technique (for example the framework presented in S. Babacan, L. Mancera, R. Molina, and A. Katsaggelos, "Non-convex priors in bayesian compressed sensing," in *17th European Signal Porocessing Conference (EUSIPCO 2009)*, (Glasgow, Scotland), 2009, which is incorporated herein by reference in its entirety).

Figure 4:
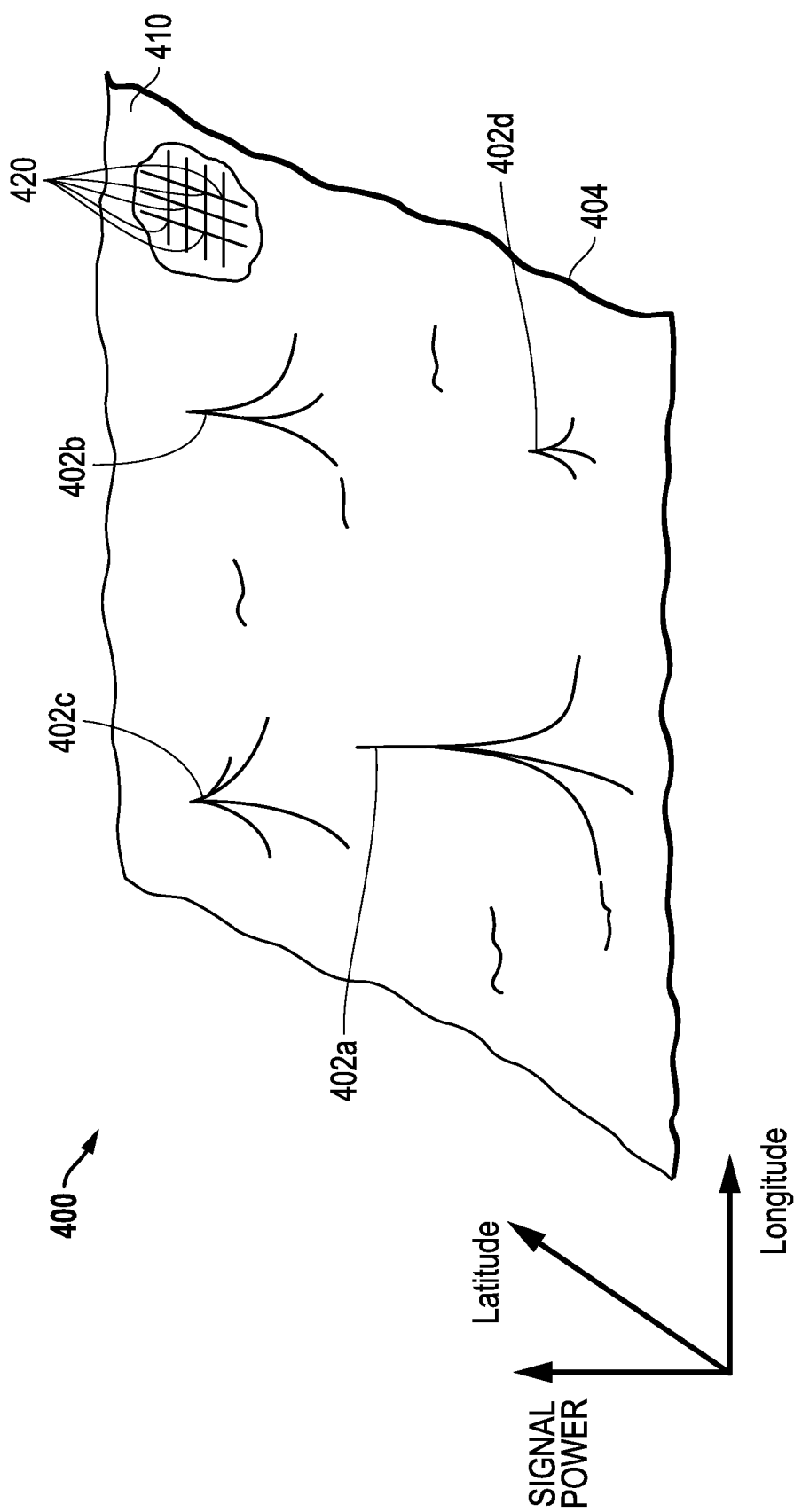
FIG. 4 illustrates a grid of potential signal location peaks according to one exemplary embodiment of the disclosed systems and methods.

FIG. 4 illustrates a grid 400 of potential signal location peaks 402a to 402d such as may be generated in one exemplary embodiment, for example, using collected IQ data (or other raw-data representations such as a IQ data covariance matrix). In this embodiment, grid 400 includes a solution grid surface 404 having earth coordinates of latitude and longitude, although any other suitable geolocation coordinate system may be employed. In the exemplary embodiment of FIG. 4, grid 400 includes a two dimensional matrix of grid points 420, as illustrated by grid detail section 410. It will be understood that each grid point may correspond in one embodiment to a unique latitude and longitude pair as well as an altitude above the earth (where the altitude may be different for each grid point), although any other suitable geolocation coordinate system may be employed. In one embodiment, the two dimensional matrix 400 of grid points 420 may be combined into a single (rasterized) vector. Each row of $C_{ser}$ in equation 29 (as solved herein) corresponds to one grid point 420. Grid 400 may be produced by taking the sum of squares of each row of $C_{ser}$. In this embodiment, the sparsity in the solution is appropriate as there are a sparse set of sharp peaks that correspond to emitter locations 402. Note that as this embodiment is formed as a sparse reconstruction problem, the weak emitters are not overshadowed by the stronger emitters (i.e., signal power is indicated by peak height as shown). In particular, grid 400 of FIG. 4 illustrates a first signal location peak 402a corresponding to a signal emitter having a strongest signal power level, second and third signal location peaks 402b and 402c corresponding to respective signal emitters having intermediate signal power levels, and a fourth signal location peak 402d corresponding to a signal emitter having a weakest signal power level. Although signal location peaks 402 are illustrated as having relatively smooth surfaces in FIG. 4, it will be understood that due to grid quantization, each peak may be composed of quantized steps at each grid point 420 of grid 400. The solution grid surface 404 may be displayed to a user (e.g., on a GUI display) of this exemplary embodiment in a variety of manners, including a three-dimensional rendering (as shown in FIG. 4), a contour plot, or using any other suitable graphical technique. The peaks (e.g., 420a, 420b, 420c and 420d) produced from the single-pass sparse reconstruction technique may be used to determine emitter locations. The emitter locations may alternatively be determined iteratively (one peak at a time) using an iterative sparse reconstruction technique (e.g., the exemplary method in IV-3 where peaks are identified and cancelled), in which case the peaks in the intermediate surfaces may not be as sharp and the overall intermediate surfaces may not be as sparse. In this latter case, the solution grid surface 404 may be displayed to a user in real time (or replayed versus time) such that the strongest peaks remaining after each iteration is clearly displayed.

Once (29) is solved and a discrete set of locations (a basis) is found, the positions may be refined numerically. This operation will be discussed in Section IV-C.

B. Iterative Solution Methods

Many iterative techniques exist for solving sparse reconstruction problems. Some popular approaches are to use greedy methods to iteratively find a sparse set of dictionary vectors that reconstruct the data. Rather than an $l_1$-norm approximation to enforce sparsity, the $l_0^0$-norm is used. This norm is typically defined as $$\|z\|_0^0 \triangleq \sum_i |z_i|^0$$

and essentially returns the number of non-zero elements of a vector. The resulting problem is then $$\operatorname*{argmin}_{c_1,\ldots,c_{N_e}} \|F_n^{-1}(Y - MC_{ser})\|_{[q,2]}^q + \|C_{par}F_c^{-H}\|_{[0,2]}^1. \tag{30}$$

The formulation (30) may be viewed a modification (or extension) of (19), and the same definitions for the component matrices of (19) in Section IV-A may be applied to the component matrices of (30). As in Section IV-A, the collected data blocks may be represented in many forms (reflected in the choice for the matrices that make up Y and M). The example methodology 300 described in this section uses data covariance information in Y, although other data representations are possible.

Since (30) uses a mixed norm, the number of rows of $C_{par}$ with non-zero elements will likely be sparse. Although (30) produces a solution that is sparse, it is not a convex problem, and thus is a combinatorial problem. Greedy methods tailored or designed specially for this problem may find an approximate (but possibly exact) solution to (30). As with (29) the coefficient matrices in (30) are combined both in serial and in parallel, and thus (30) may not be solvable with standard greedy iterative sparse reconstruction methods (such as OMP).

Without loss of generality, the actual problem solved will be $$\operatorname*{argmin}_{c_1,\ldots,c_{N_e}} \|Y - MC_{ser}\|_{[q,2]}^q + \|C_{par}\|_{[1,2]}^1, \tag{31}$$

in order to simplify the algorithm description. The correlation in the noise samples, along with the time correlation of the signal powers, may be accounted for by careful pre-whitening. Thus the method that solves (31) may be able to solve (30).

In the practice of the disclosed systems and methods, one possible difference that may be employed from other greedy methods is that the solution positions may optionally be adjusted numerically (off of the dictionary) at each iteration to improve accuracy.

FIG. 3 illustrates an example methodology 300 as it may be performed to locate radio frequency SW emitter/s using at least a single moving signal collection platform and direct IQ emitter geolocation. Further, one example embodiment of an algorithm that may be used for iterative direct geolocation to implement methodology 300 is described below.

The symbols used in the following exemplary algorithm are as follows:

i is the iteration number. A vector or set at iteration i will be indicated with a (i) superscript.

$\hat{p}^{(i)}$ is a set of position estimate vectors at iteration i. The length of this set will grow with each iteration so that the number of elements of $\hat{p}^{(i)}$ is i. Note that these vectors may not lie exactly on the grid of position vectors $p_m$ as they may be corrected numerically. In the end, this set will contain the geolocation position estimates of all the emitters detected.

$\hat{b}^{(i)}$ is the set of indices into the grid of locations $p_m$ at which each emitter was (initially) estimated to be located at. Each element of $\hat{b}^{(i)}$ corresponds to a single initial $p_m$ and an element in $\hat{p}^{(i)}$.

$\hat{a}^{(i)}$ is a set of array response vectors, each vector associated with its respective position in $\hat{p}^{(i)}$.

$\hat{\gamma}^{(i,k)}$ is a vector of power estimates for block k at iteration i. Each element of $\hat{\gamma}^{(i,k)}$ is associated with one position vector from $\hat{p}^{(i)}$. The length of this vector will grow with each iteration so that $\hat{\gamma}^{(i,k)} \in \mathbb{R}_{\geq 0}^i$.

$\hat{R}_{e,k}^{(i)}$ is the covariance residual for covariance $R_{y,k}$ from data block block k. This is the portion of the covariance which remains after cancelling as much of each $R_{y,k}$ as possible using the signal estimates $\hat{R}_{x,k}^{(i-1)}$ from the previous iteration.

$\hat{R}_{x,k}^{(i)}$ is the estimate of the signal portion of the data covariance $R_{y,k}$, using $\hat{\gamma}^{(i,k)}$ and $\hat{a}^{(i)}$. The estimate for iteration i will be used in the subsequent iteration (i+1) to produce $\hat{R}_{e,k}^{(i+1)}$.

Following is a description of this exemplary algorithm, it being understood that other algorithms, as well as alternative methodologies to method 300 (e.g., having fewer, additional and/or alternative steps) may be employed that are suitable for geolocation of one or more SW emitters.

When methodology 300 is implemented using the following exemplary algorithm, it may begin in a manner corresponding to step 302 of FIG. 3, with no estimates for position or power. As shown, methodology includes iterative steps 304 to 312 that may be implemented in one embodiment during each iteration by lines 4 to 17 of the following exemplary algorithm. For example, the first task (lines 5 to 8 of the following algorithm) is to reconstruct as much as possible from each $R_{y,k}$ using the power and position estimates from the previous iteration, corresponding to step 304 of methodology 300. The second task (line 9 of the following algorithm) is to project each $\hat{R}_{e,k}^{(i)}$ onto the space spanned by array response vectors at time k for the entire grid of locations $p_m$, then choose the best single location (which has not already been chosen), corresponding to step 306 of methodology 300. In one exemplary embodiment it may be that this is the statistically-optimal estimator for a single signal in AWGN, under certain reasonable assumptions.

Next, on line 10 of the following algorithm the set of grid location indices used ($\hat{b}^{(i)}$) is augmented to include the new index ($\hat{m}$) from line 9. On line 11 of the following algorithm the set of emitter geolocations positions ($\hat{p}^{(i)}$) is augmented to include the grid location ($p_{\hat{m}}$) associated with the index ($\hat{m}$) found on line 10. In the loop from lines 12 to 15 of the following algorithm signal power estimates ($\hat{p}^{(i)}$) for each located emitter (i) and each block (k) is updated (on line 14), corresponding to step 308 of methodology 300. The power estimate is the same estimate derived in (24). Before updating powers for each block, a set of array response vector estimates ($\hat{a}^{(i,k)}$) is obtained from the current set of position estimates ($\hat{p}^{(i)}$) on line 13. Finally, step 310 of methodology 300 is implemented by the following exemplary algorithm on line 16 by updating all positions assuming a fixed set of powers, a fixed set of active emitters, and some numerical model for the variation of $a_k$ as a function of position. An exemplary technique for implementing line 16 of the following algorithm may also be used to lead to an EEP at the last iteration, and is described further in Section IV-C herein.

As shown in FIG. 3, steps 304 to 312 of methodology 300 may iteratively repeat until a termination criteria is found satisfied in step 312, for example when a particular percentage of received power has been accounted for by all geolocated sources. After the last iteration occurs, methodology 300 proceeds to step 314, where location/s confidence may be computed and locations may be reported, e.g., displayed, output to storage set, etc.

---

Algorithm 1 Exemplary algorithm for Iterative Direct Geolocation

1: procedure GEOLOCATION($N_i, R_{y,1}, \ldots, R_{y,N_b}$)
2:     $\hat{b}^{(0)} \leftarrow \emptyset$
3:     $\hat{p}^{(0)} \leftarrow \emptyset$
4:     for i ← 1, $N_i$ do
5:       for k ← 1, $N_b$ do
6: 
$$\hat{R}_{x,k}^{(i-1)} \leftarrow \sum_{l=1}^{i-1} \hat{a}_l^{(i-1,k)} (\hat{a}_l^{(i-1,k)})^H \hat{\gamma}_l^{(i-1,k)}$$

7:       $\hat{R}_{e,k}^{(i)} \leftarrow R_{y,k} - \hat{R}_{x,k}^{(i-1)}$
8:     end for
9: 
$$\hat{m} \leftarrow \underset{m \notin \hat{b}^{(i-1)}}{\arg\max} \sum_{k=1}^{N_e} a_k(p_m)^H \hat{R}_{e,k}^{(i-1)} a_k(p_m)$$

10:    $\hat{b}^{(i)} \leftarrow \{\hat{b}^{(i-1)}, \hat{m}\}$
11:    $\hat{p}^{(i)} \leftarrow \{\hat{p}^{(i-1)}, p_{\hat{m}}\}$
12:    for k ← 1, $N_b$ do
13:      $\hat{a}^{(i,k)} \leftarrow \{a_k(\hat{p}_1^{(i)}), \ldots, a_k(\hat{p}_i^{(i)})\}$
14:      $\hat{\gamma}^{(i,k)} \leftarrow \underset{\sigma_{s,k}^2}{\arg\max}\ p(\sigma_{s,k}^2 | R_{y,k}, \hat{a}^{(i,k)})$
15:    end for
16: 
$$\hat{p}^{(i)} \leftarrow \underset{\hat{p}^{(i)}}{\arg\max} \prod_{k=1}^{N_b} p(\hat{p}^{(i)} | R_{y,k}, \hat{a}^{(i,k)}, \hat{\gamma}^{(i,k)})$$

*-continued*

Algorithm 1 Exemplary algorithm for Iterative Direct Geolocation

17:    end for
18:    return $\hat{p}^{(i)}$
19: end procedure

---

C. Grid Refinement Methods

The following section describes exemplary techniques to optionally refine position estimates once a sparse set of (rough) locations is determined, e.g., in order to implement optional step 310 of methodology 300. In the practice of the disclosed systems and methods, such a position refinement technique may be employed to accomplish one or more purposes, such as:

To correct for the quantization effects of using a quantized set of potential locations. For example, this could be used after a sparse reconstruction solution.

To improve estimates during an iterative sparse reconstruction approach. For greedy techniques initial position decisions are fixed and may be worse than later iterations where more interference has been cancelled. An approach such as this allows all the positions to be updated jointly as new emitters are identified.

To compute an EEP for the position estimates. This may provide a confidence on the estimates, which may be formed jointly as this geolocation is itself a joint estimation problem.

Following is a description of two exemplary techniques for achieving this refinement, it being understood that any other suitable refinement technique/s may alternatively be employed. These two exemplary techniques are as follows:

1. Adapting the grid of locations to add extra candidate locations around an estimate.

2. Using a numerical model of the received data as a function of position to numerically solve for all positions, e.g., in a manner similar to employed with geolocation using observables. For example, a first order Taylor-series approximation of the array response vectors may be used as a function of position, which may be converted to a joint probability of the received data as a function of position.

Using either of the above exemplary techniques, the problem may be solved using the rough estimates of position ($\hat{p}_i$) and power ($\hat{\gamma}_k$) as prior information.

$$\underset{p_1, \ldots, p_{N_e}}{\arg\max} \prod_{k=1}^{N_b} p(p_1, \ldots, p_{N_e} | R_{y,k}, a_k(\hat{p}_1), \ldots, a_k(\hat{p}_{N_e}), \hat{\gamma}_k).$$

It will be understood that one or more of the tasks, functions, or methodologies described herein may be implemented, for example, as firmware or other computer program of instructions which may be embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for locating at least one signal wave (SW) emitter of unknown modulation and transmitting from an unknown location using a single moving signal collection platform, comprising:

collecting a raw data representation of SW signal emissions within a SW emissions environment only at the single moving collection platform, the raw data representation of SW signal emissions including SW emissions of unknown modulation from the SW emitter transmitting from an unknown location, and the raw data representation including data samples having magnitudes that are characteristic of received signal energy of the SW emitter;

estimating the signal energy transmitted within the SW emissions environment from a two or three dimensional grid of locations using the raw data representation collected only at the single moving signal collection platform; and determining the location of the SW emitter on the two dimensional or three dimensional grid from an estimated signal energy distribution across the two or three dimensional grid without knowledge of either the modulation or transmitted location of the SW emissions from the SW emitter and without determining any intermediate geolocation observable measurement.

2. A method for locating at least one signal wave (SW) emitter of unknown modulation using a single moving signal collection platform, comprising:

collecting a raw data representation of SW signal emissions within a SW emissions environment only at the single moving collection platform, the raw data representation of SW signal emissions including SW emissions of unknown modulation from the SW emitter, and the raw data representation including data samples having magnitudes that are characteristic of received signal energy of the SW emitter;

estimating the signal energy transmitted within the SW emissions environment from a two or three dimensional grid of locations using the raw data representation collected only at the single moving signal collection platform; and determining the location of the SW emitter on the two dimensional or three dimensional grid from an estimated signal energy distribution across the two or three dimensional grid without knowledge of the modulation of the SW emissions from the SW emitter and without determining any intermediate geolocation observable measurement;

where the collected raw data representation of SW signal emissions includes SW emissions from multiple SW emitters of unknown modulation collected only at the single moving signal collection platform; where the raw data representation includes data samples having magnitudes that are characteristic of received signal energy of each of the SW emitters; and where the method further comprises:

decomposing and separating the received signal energy of the raw data representation into the signal energy contributions for each of the multiple SW emitters at a single location on the grid; and determining a location of each of the multiple SW emitters on the grid based at least in part on the received signal energy contribution of each SW emitter without knowledge of the modulation of the SW emissions from any of the multiple SW emitters and without determining any intermediate geolocation observable measurements;

where each SW emitter remains stationary on the grid at the same time that the signal collection platform moves relative to the SW emitter and collects the raw data representation of SW signal emissions.

3. The method of claim 2, further comprising decomposing and separating the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter; or a combination thereof.

4. The method of claim 2, further comprising:

using an interferometer array on the single moving collection platform to collect the raw data representation of SW signal emissions within the SW emissions environment, the interferometer array comprising multiple spaced antenna elements, and the number of multiple SW emitters on the grid exceeding a number of elements of the interferometer array; and using overloaded array processing to determine a location of each of the multiple SW emitters on the grid, the number of determined emitter locations exceeding the number of antenna elements of the interferometer.

5. The method of claim 4, where the overloaded array processing comprises using iterative serial nulling to process the collected raw data representation of SW signal emissions including the SW emissions from the multiple SW emitters by:

(a) identifying the geolocation of the strongest emitter signal on or between grid points of the quantized grid that is currently present in the collected raw data representation;

(b) then removing the signal energy contribution of the previously identified strongest emitter signal energy to produce a new collected raw data representation that does not include the signal energy of previously identified strongest emitter signal; and (c) then repeating steps (a) and (b) to identify the geolocation of a greater number of emitter signals than the number of antenna elements in the interferometer array.

6. A method for locating at least one moving signal wave (SW) emitter of unknown modulation using a single moving signal collection platform that is different from the moving SW emitter, comprising:

collecting a raw data representation of SW signal emissions within a SW emissions environment only at the single moving collection platform that is different from the moving SW emitter, the raw data representation of SW signal emissions including SW emissions of unknown modulation from the moving SW emitter, and the raw data representation including data samples having magnitudes that are characteristic of received signal energy of the moving SW emitter;

estimating the signal energy transmitted within the SW emissions environment from a two or three dimensional grid of locations using the raw data representation collected only at the single moving signal collection platform; and determining the location of the moving SW emitter on the two dimensional or three dimensional grid from an estimated signal energy distribution across the two or three dimensional grid without knowledge of the modulation of the SW emissions from the SW emitter and without determining any intermediate geolocation observable measurement;

where the method further comprises:

estimating the signal energy transmitted from the moving SW emitter at multiple locations on the two or three dimensional grid of locations at respective different times using the collected raw data representation, and determining the multiple locations of the moving SW emitter at the respective different times on the two dimensional or three dimensional grid from the estimated signal energy distribution across the two or three dimensional grid as it changes over time.

7. The method of claim 1, further comprising using an interferometer array on the single moving collection platform to collect the raw data representation of SW signal emissions within the SW emissions environment, the interferometer array comprising multiple spaced antenna elements.

8. The method of claim 1, further comprising determining the location of the SW emitter on a two-dimensional grid which represents a quantized set of potential emitter locations that span a local physical area having grid points that each correspond to a unique latitude and longitude pair; and where each grid point also corresponds to a single value of altitude above the earth.

9. A signal wave (SW) emitter location system, comprising a single mobile signal collection platform including at least one antenna element coupled to signal processing circuitry and configured to receive SW signal emissions within a SW emissions environment as the signal collection platform is moving; where the signal processing circuitry is configured to:

use the at least one antenna element to collect a raw data representation of the SW signal emissions within the SW emissions environment as the signal collection platform is moving, the raw data representation of SW signal emissions including SW emissions from at least one SW emitter of unknown modulation and transmitting from an unknown location, and the raw data representation including data samples having magnitudes that are characteristic of received signal energy of the SW emitter;

estimate the signal energy transmitted within the SW emissions environment from a two or three dimensional grid of locations using the raw data representation collected only at the single moving signal collection platform; and determine the location of the SW emitter on the two dimensional or three dimensional grid from an estimated signal energy distribution across the two or three dimensional grid without knowledge of either the modulation or transmitted location of the SW emissions from the SW emitter and without determining any intermediate geolocation observable measurement.

10. A signal wave (SW) emitter location system, comprising a single mobile signal collection platform including at least one antenna element coupled to signal processing circuitry and configured to receive SW signal emissions within a SW emissions environment as the signal collection platform is moving; where the signal processing circuitry is configured to:

use the at least one antenna element to collect a raw data representation of the SW signal emissions within the SW emissions environment as the signal collection platform is moving, the raw data representation of SW signal emissions including SW emissions from at least one SW emitter of unknown modulation, and the raw data representation including data samples having magnitudes that are characteristic of received signal energy of the SW emitter;

estimate the signal energy transmitted within the SW emissions environment from a two or three dimensional grid of locations using the raw data representation collected only at the single moving signal collection platform; and determine the location of the SW emitter on the two dimensional or three dimensional grid from an estimated signal energy distribution across the two or three dimensional grid without knowledge of the modulation of the SW emissions from the SW emitter and without determining any intermediate geolocation observable measurement;

where the collected raw data representation of SW signal emissions includes SW emissions from multiple SW emitters of unknown modulation collected only at the single moving signal collection platform; where the raw data representation includes data samples having magnitudes that are characteristic of received signal energy of each of the SW emitters; and where the signal processing circuitry is further configured to:

decompose and separate the received signal energy of the raw data representation into the signal energy contributions for each of the multiple SW emitters at a single location on the grid, and determine a location of each of the multiple SW emitters on the grid based at least in part on the received signal energy contribution of each SW emitter without knowledge of the modulation of the SW emissions from any of the multiple SW emitters and without determining any intermediate geolocation observable measurements, where each SW emitter remains stationary on the grid at the same time that the signal collection platform moves relative to the SW emitter and collects the raw data representation of SW signal emissions.

11. The system of claim 10, where the signal processing circuitry is further configured to decompose and separate the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter, or a combination thereof.

12. The system of claim 10, where the at least one antenna array comprises an interferometer array comprising multiple spaced antenna elements; and where the signal processing circuitry is further configured to:

use the interferometer array on the single moving collection platform to collect the raw data representation of SW signal emissions within the SW emissions environment, the interferometer array comprising multiple spaced antenna elements, and the number of multiple SW emitters on the grid exceeding a number of elements of the interferometer array; and use overloaded array processing to determine a location of each of the multiple SW emitters on the grid, the number of determined emitter locations exceeding the number of antenna elements of the interferometer.

13. The system of claim 12, where the signal processing circuitry is further configured to use iterative serial nulling to process the collected raw data representation of SW signal emissions including the SW emissions from the multiple SW emitters by:

(a) identifying the geolocation of the strongest emitter signal on or between grid points of the quantized grid that is currently present in the collected raw data representation;
(b) then removing the signal energy contribution of the previously identified strongest emitter signal energy to produce a new collected raw data representation that does not include the signal energy of previously identified strongest emitter signal; and
(c) then repeating steps (a) and (b) to identify the geolocation of a greater number of emitter signals than the number of antenna elements in the interferometer array.

14. A signal wave (SW) emitter location system, comprising a single mobile signal collection platform including at least one antenna element coupled to signal processing circuitry and configured to receive SW signal emissions within a SW emissions environment as the signal collection platform is moving; where the signal processing circuitry is configured to:
use the at least one antenna element to collect a raw data representation of the SW signal emissions within the SW emissions environment as the signal collection platform is moving, the raw data representation of SW signal emissions including SW emissions from at least one moving SW emitter of unknown modulation and that is different from the moving collection platform, and the raw data representation including data samples having magnitudes that are characteristic of received signal energy of the moving SW emitter;
estimate the signal energy transmitted within the SW emissions environment from a two or three dimensional grid of locations using the raw data representation collected only at the single moving signal collection platform; and
determine the location of the moving SW emitter on the two dimensional or three dimensional grid from an estimated signal energy distribution across the two or three dimensional grid without knowledge of the modulation of the SW emissions from the SW emitter and without determining any intermediate geolocation observable measurement;
where the signal processing circuitry is further configured to:
estimate the signal energy transmitted from a given moving SW emitter at multiple locations on the two or three dimensional grid of locations at respective different times using the collected raw data representation, and
determine the multiple locations of the SW emitter at the respective different times on the two dimensional or three dimensional grid from the estimated signal energy distribution across the two or three dimensional grid as it changes over time.

15. The system of claim 9, where the at least one antenna array comprises an interferometer array comprising multiple spaced antenna elements; and where the signal processing circuitry is further configured to use the interferometer array on the single moving collection platform to collect the raw data representation of SW signal emissions within the SW emissions environment.

16. The system of claim 9, where the signal processing circuitry is further configured to determine the location of the SW emitter on a two-dimensional grid which represents a quantized set of potential emitter locations that span a local physical area having grid points that each correspond to a unique latitude and longitude pair; and where each grid point also corresponds to a single value of altitude above the earth.

17. A method for locating at least one signal wave (SW) emitter using at least a single moving signal collection platform, comprising:
collecting a raw data representation of SW signal emissions within a SW emissions environment at the single moving collection platform, the raw data representation of SW signal emissions including SW emissions from the SW emitter, and the raw data representation including data samples having magnitudes that are characteristic of received signal energy of the SW emitter;
estimating the signal energy transmitted within the SW emissions environment from a two or three dimensional grid of locations using the collected raw data representation; and
determining the location of the SW emitter on the two dimensional or three dimensional grid from an estimated signal energy distribution across the two or three dimensional grid; where the collected raw data representation of SW signal emissions includes SW emissions from multiple SW emitters;
where the raw data representation includes data samples having magnitudes that are characteristic of received signal energy of each of the SW emitters; and where the method further comprises:
decomposing and separating the received signal energy of the raw data representation into the signal energy contributions for each of the multiple SW emitters at a single location on the grid, and
determining a location of each of the multiple SW emitters on the grid based at least in part on the received signal energy contribution of each SW emitter,
where each SW emitter remains stationary on the grid at the same time that the signal collection platform moves relative to the SW emitter and collects the raw data representation of SW signal emissions; and
where the method further comprises decomposing and separating the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter; or a combination thereof.

18. The method of claim 17, where the at least single moving signal collection platform comprises multiple moving signal collection platforms; and where the method further comprises collecting the raw data representation of SW signal emissions within the SW emissions environment at the multiple moving collection platforms.

19. The method of claim 17, where the at least single moving signal collection platform comprises only a signal moving signal collection platform; and where the method further comprises collecting the raw data representation of SW signal emissions within the SW emissions environment only at the single moving collection platform.

20. The method of claim 17, where only partial modulation information is known for at least one of the SW emitters without full knowledge of the signal modulation of the at least one SW emitter, the partial information comprising timing structure of the at least one SW emitter, frequency structure of the at least one SW emitter, or a combination thereof; and where the step of determining the location of the at least one SW emitter on the grid further comprises using the known partial modulation information of the SW emitter to improve the accuracy of the determined geolocation of the SW emitter without consideration of a known reference signal.

21. The method of claim 17, where no signal modulation information is known for at least one of the SW emitters; and where the step of determining the location of the at least one SW emitter on the grid further is performed without any knowledge of the signal modulation of the at least one of the SW emitters.

22. A SW emitter location system, comprising at least one mobile signal collection platform including at least one antenna element coupled to signal processing circuitry and configured to receive SW signal emissions within a SW emissions environment as the signal collection platform is moving; where the signal processing circuitry is configured to:
   use the at least one antenna element to collect a raw data representation of the SW signal emissions within the SW emissions environment as the signal collection platform is moving, the raw data representation of SW signal emissions including SW emissions from the SW emitter, and the raw data representation including data samples having magnitudes that are characteristic of received signal energy of the SW emitter;
   estimate the signal energy transmitted within the SW emissions environment from a two or three dimensional grid of locations using the collected raw data representation; and
   determine the location of the SW emitter on the two dimensional or three dimensional grid from an estimated signal energy distribution across the two or three dimensional grid;
   where the collected raw data representation of SW signal emissions includes SW emissions from multiple SW emitters; where the raw data representation includes data samples having magnitudes that are characteristic of received signal energy of each of the SW emitters; and where the signal processing circuitry is further configured to:
      decompose and separate the received signal energy of the raw data representation into the signal energy contributions for each of the multiple SW emitters at a single location on the grid, and
      determine a location of each of the multiple SW emitters on the grid based at least in part on the received signal energy contribution of each SW emitter,
      where each SW emitter remains stationary on the grid at the same time that the signal collection platform moves relative to the SW emitter and collects the raw data representation of SW signal emissions; and
   where the signal processing circuitry is further configured to decompose and separate the received signal energy of the raw data representation into the signal energy contributions for each of the multiple SW emitters using at least one of single pass sparse reconstruction that jointly and simultaneously estimates the contribution of each emitter; iterative serial nulling or cancellation that separately and sequentially estimates the contribution of each emitter, or a combination thereof.

23. The system of claim 22, where the at least one mobile signal collection platform includes multiple mobile signal collection platforms that each includes at least one antenna element; and where the signal processing circuitry is configured to use the at least one antenna element on each of the multiple signal collection platforms to collect the raw data representation of the SW signal emissions within the SW emissions environment as the multiple signal collection platforms are moving.

24. The system of claim 22, where the at least one mobile signal collection platform includes only a single mobile signal collection platform that includes at least one antenna element; and where the signal processing circuitry is configured to use the at least one antenna element on only the single signal collection platform to collect the raw data representation of the SW signal emissions within the SW emissions environment as the single signal collection platform is moving.

25. The system of claim 22, where the signal processing circuitry is further configured to:
   determine the location of at least one SW emitter on the grid for which only partial modulation information is known, the partial information comprising timing structure of the at least one SW emitter, frequency structure of the at least one SW emitter, or a combination thereof; and
   use the known partial modulation information of the SW emitter to improve the accuracy of the determined geolocation of the SW emitter without consideration of a known reference signal.

26. The system of claim 22, where the signal processing circuitry is further configured to determine the location of at least one SW emitter on the grid without any knowledge of signal modulation information for the at least one SW emitter.

27. The method of claim 1, where the collected raw data representation contains SW signal emissions from one SW emitter; and where the method further comprises determining the location of the one SW emitter on the two dimensional or three dimensional grid from an estimated signal energy distribution across the two or three dimensional grid without knowledge of the modulation of the SW emissions from the one SW emitter and without determining any intermediate geolocation observable measurement.

28. The method of claim 6, where the SW emitter is transmitting from an unknown location; and where the method further comprises determining the location of the SW emitter on the two dimensional or three dimensional grid from an estimated signal energy distribution across the two or three dimensional grid without knowledge of either the modulation or transmitted location of the SW emissions from the SW emitter and without determining any intermediate geolocation observable measurement.

29. The system of claim 9, where the collected raw data representation contains SW signal emissions from one SW emitter; and where the signal processing circuitry is configured to determine the location of the one SW emitter on the two dimensional or three dimensional grid from an estimated signal energy distribution across the two or three dimensional grid without knowledge of the modulation of the SW emissions from the one SW emitter and without determining any intermediate geolocation observable measurement.

30. The method of claim 14, where the raw data representation of SW signal emissions includes SW emissions from at least one SW emitter of unknown modulation and transmitting from an unknown location; and where the signal processing circuitry is configured to determine the location of the SW emitter on the two dimensional or three dimensional grid from an estimated signal energy distribution across the two or three dimensional grid without knowledge of either the modulation or transmitted location of the SW emissions from the SW emitter and without determining any intermediate geolocation observable measurement.

* * * * *